United States Patent
Vasquez, II et al.

(10) Patent No.: US 9,286,725 B2
(45) Date of Patent: Mar. 15, 2016

(54) VISUALLY CONVINCING DEPICTION OF OBJECT INTERACTIONS IN AUGMENTED REALITY IMAGES

(71) Applicant: Nintendo of American Inc., Redmond, WA (US)

(72) Inventors: Joseph Gregory Vasquez, II, Redmond, WA (US); Steve Rabin, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 191 days.

(21) Appl. No.: 14/079,814

(22) Filed: Nov. 14, 2013

(65) Prior Publication Data

US 2015/0130790 A1 May 14, 2015

(51) Int. Cl.
*G06T 19/00* (2011.01)

(52) U.S. Cl.
CPC ..... *G06T 19/006* (2013.01); *G06T 2207/30204* (2013.01); *G06T 2210/21* (2013.01)

(58) Field of Classification Search
CPC .............. G06T 19/006; G06T 2207/30204; G06T 7/0046; G06T 15/00; G06T 19/00; G06T 17/00; G06T 2215/16; G06T 2210/21; A61B 2019/5291; H04N 13/0278; G06F 3/04815
See application file for complete search history.

(56) References Cited

U.S. PATENT DOCUMENTS

| | | | |
|---|---|---|---|
| 2009/0128552 A1* | 5/2009 | Fujiki et al. | 345/419 |
| 2009/0245681 A1* | 10/2009 | Kobayashi | 382/275 |
| 2012/0108332 A1* | 5/2012 | Baseley et al. | 463/31 |
| 2013/0106910 A1* | 5/2013 | Sacco | 345/633 |
| 2014/0002493 A1* | 1/2014 | Mitchell et al. | 345/633 |
| 2014/0210947 A1* | 7/2014 | Finn et al. | 348/46 |

\* cited by examiner

*Primary Examiner* — Haixia Du
(74) *Attorney, Agent, or Firm* — Nixon & Vanderhye, P.C.

(57) ABSTRACT

The disclosure provide for improved depiction of interactions between virtual objects and physical objects in augmented reality (AR) images, and may include operations for: receiving a captured image of the real world physical structure, the captured image provided by a camera disposed in a housing; identifying, by image processing performed on the captured image using at least one processor arrangement, the at least one marker disposed at a location of the real world physical structure; determining aspects of user viewpoint of the housing relative to the physical structure at least in part in response to the identified at least one marker; using an at least partial three dimensional model of the real world physical structure to determine a view of interaction between the real world physical structure and the provided virtual object from the determined user viewpoint; and displaying, on a display, an augmented reality view of the captured image including the determined view of the interaction.

28 Claims, 19 Drawing Sheets

VISUALLY CONVINCING DEPICTION OF OBJECT INTERACTIONS IN AUGMENTED REALITY IMAGES

BACKGROUND

Augmented reality (AR) technology presents real world information augmented by virtual information. Real world information includes data from any of many types of sensors, such as, accelerometers, GPS devices, compasses, gyroscopes, proximity sensors, and cameras.

Virtual objects are objects within a software application that can be drawn to a display device. Virtual objects populate the virtual world created by an application, and include video game characters, trees, mountains, animals, fireworks, arrows, dragons, baseballs, etc. within the application.

A common application of AR is for displaying live video or still images of the real world with virtual objects drawn over (e.g. superimposed) the real world imagery. To produce such AR images, a camera captures a video or still image of the real world, and one or more virtual objects are superimposed on the captured image.

AR markers (sometimes referred to herein as "markers") placed in the real world are used to draw virtual objects at particular positions and orientations in virtual worlds. AR markers, which are also known as fiducial markers, are real world objects (e.g. physical objects) that are often used in camera-based AR applications. They are visual cues that computer systems can recognize within a captured image of the real world.

One example type of a fiducial marker is a device that emits a specific color of light. By recognizing the color, the system can determine that a marker is found. A reference point and coordinate system is then estimated by considering the size and shape of the light projected onto the camera image.

Another example type of AR marker is a visual symbol, such as a picture or pattern printed on a piece of paper or other surface. Based upon a known symbol definition, a computer system can search the captured image to find a group of pixels that match the symbol. If the symbol is found, the system assumes that the marker is within the real world scene. The size, shape, and orientation of the marker located within the image can then be analyzed to determine a reference point and coordinate system for the scene in the captured image.

AR images are entertaining when the virtual objects are drawn so that they convincingly appear to exist in the real world. However, in many scenarios, the depiction of interactions between virtual and physical objects in AR images is less than realistic.

Therefore, among other potential improvements, it is desired that techniques for more realistic depictions of object interactions in AR images are developed.

DETAILED DESCRIPTION

Figure 1:
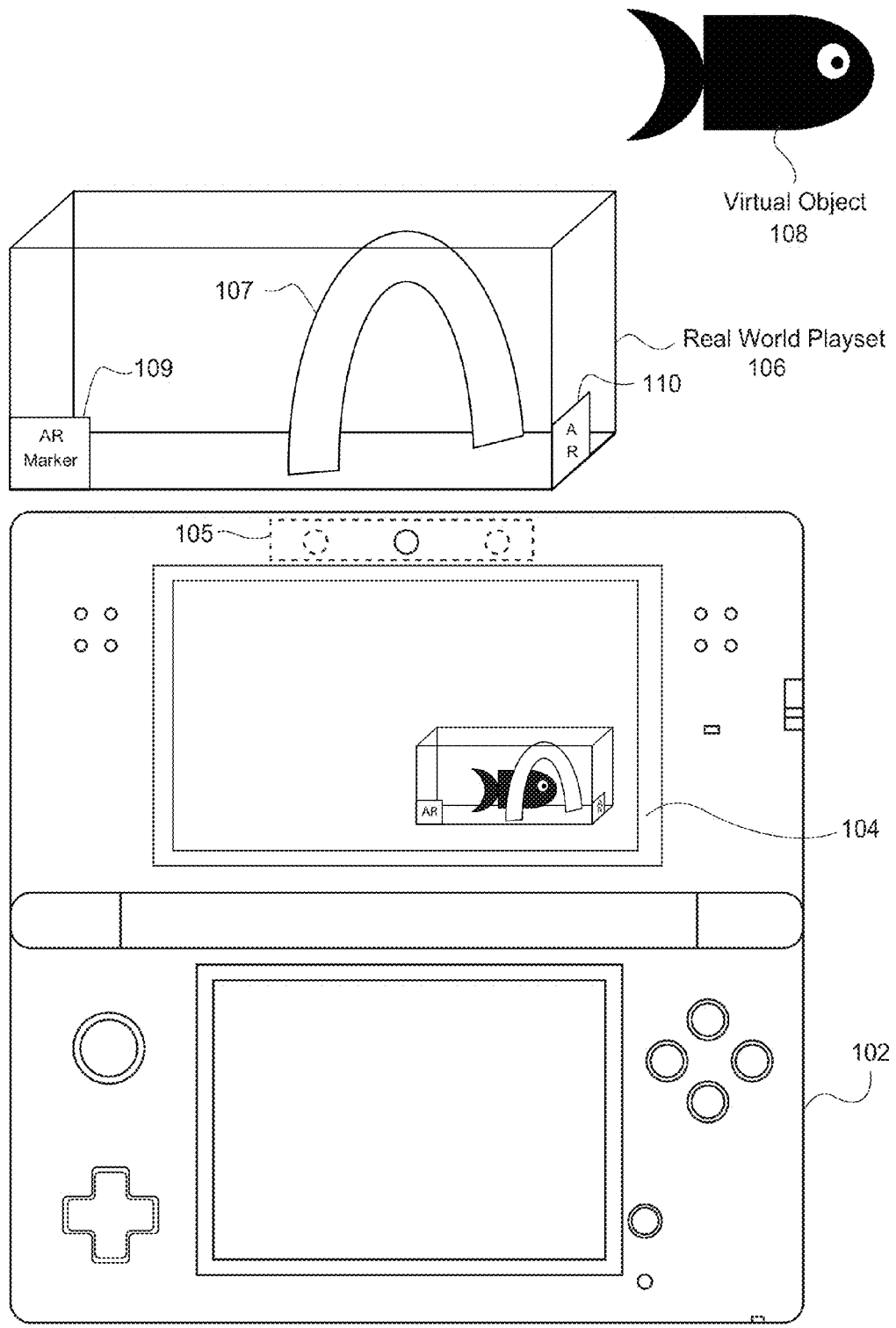
FIG. 1 illustrates a processing system configuration and screenshot, according to an embodiment.

Example embodiments of this disclosure include an image processing system, an image processing method, an image processing apparatus, and a medium on which an image processing program is recorded. These embodiments will be described with reference to the accompanying drawings. It should be noted that the embodiments described below are illustrative only, in order to describe, for example, how the program according to this disclosure is executed, and it is not intended to limit the program or the like according to this disclosure to specific configurations described below. In order to execute the program or the like according to this disclosure, other specific configurations may be employed as appropriate according to the embodiments.

An AR application displays virtual objects and physical objects together in the same scene. Moving a camera during execution of the AR application and allowing virtual objects to move and animate a video stream or stream of still images creates a dynamic scene, and may provide interactive entertainment. Much of the entertainment in AR applications is due to the visual appearance that virtual objects actually exist in the real world.

Although AR markers are used to incorporate virtual objects to a real world scene, AR markers alone do not account for some frequently occurring scenes where virtual and physical objects appear together and/or interact. For example, an AR marker alone gives no information to the AR application about the 3D structure of the real world other than the marker itself: the AR application can estimate the position and orientation of the AR marker in the real world relative to the camera, but the structure of the real world environment beyond the AR marker is not known. Therefore, conventional AR applications typically assume that the real world consists only of an open 3D plane defined by the AR marker, and any interaction with other physical objects is undetected or ignored. This often causes virtual objects in conventional AR applications to appear unrealistic due to the ignoring real world locations, disobeying physical boundaries, or being drawn incorrectly.

Constraints that prevent such interactions from being appropriately depicted by conventional techniques can be grouped into three categories: reference constraints, collision constraints, and occlusion constraints. Reference constraints refer to mapping a position and orientation of an AR marker to one or more locations within a physical object. Collision constraints refer to detecting and predicting penetration (e.g. collision) between virtual objects and physical objects. Occlusion constraints refer to drawing virtual objects properly when they are located behind a physical object.

However, as illustrated by embodiments disclosed herein, with the use of appropriate information about a real world scene, virtual objects can be drawn convincingly to appear as though they really exist within the real world. Embodiments disclosed herein include methods, apparatus, systems, and computer-readable medium where AR application software is used in conjunction with models of physical objects in order to realistically illustrate interactions between virtual and physical objects. In embodiments, virtual and physical objects are convincingly displayed in AR images by appropriately addressing the reference, collision, and/or occlusion constraints using the disclosed embodiments, as the objects interact.

Some embodiments include "AR playsets" to provide AR applications with accurate information about the physical structure of the real world. An AR playset includes one or more physical objects (AR playsets are also referred to herein as "physical structures"), and incorporates AR markers into the physical objects for use in AR applications, enabling interactions that involve aspects of reference, collision, and/or occlusion between virtual and physical objects to be properly handled. Model information corresponding to each AR playset are used to determine 3D information regarding one or more physical objects in the AR playset, and such 3D information is then used to appropriately address aspects of reference, collision, and/or occlusion between virtual objects and the one or more physical objects in the AR playset.

FIG. 1 illustrates an image processing system and screenshot according to an embodiment. An example image processing device 102 includes at least one display area 104 and camera 105. Camera 105 includes one or more cameras configured to capture at least one image of the real world, and may include either or both a front-facing (e.g. view directed towards user) camera or a rear-facing (e.g. view directed away from user) camera. FIG. 1 also shows an AR playset 106 and a virtual object 108. As illustrated, AR playset 106 represents a fish tank with a rock 107 inside it. Virtual object 108 represents a fish.

Display 104 displays an AR image in which a virtual object (e.g. virtual fish 108) interacts with a physical object (e.g. fish tank). Specifically, the AR image displayed in display 104 illustrates virtual fish 108 appearing to be in fish tank AR playset 106 and peeking from behind rock 107. Virtual fish 108 is properly displayed as being partly occluded by the rock 107. Having characteristics of object interactions, such as, for example, the occlusion shown in FIG. 1, properly displayed improves the realistic appearance of the AR image, and thus its entertainment value.

Figure 6A:
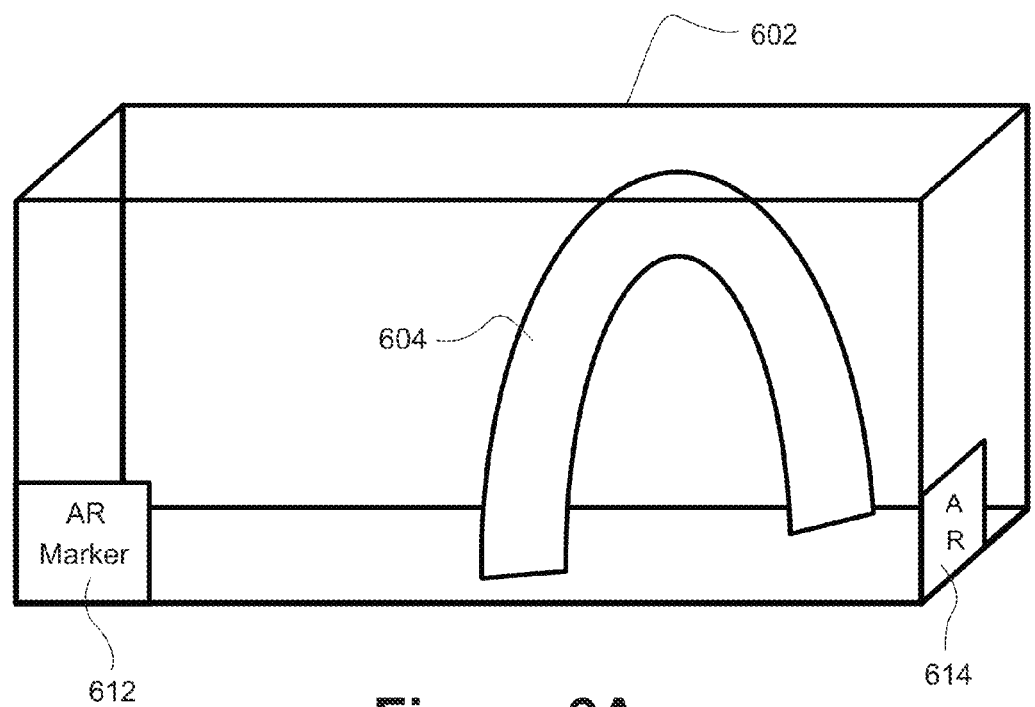
FIG. 6A shows an example AR playset representing a fish tank, according to an embodiment.

The image displayed in display 104 is based upon the real world fish tank AR playset 106, an image of which is captured by camera 105 as a real world (also referred to as "real space") image. The AR playset 106 includes AR markers 109 and 110. Fish tank AR playset 106, fish virtual object 108, and AR markers 109 and 110 are described below in relation to FIGS. 6A-6C.

AR playsets are particularly useful when AR applications include reference, collision, and occlusion interactions among objects. An AR playset has three properties: one or more AR markers are visibly contained in the AR playset; the position and orientation of at least one AR marker is known relative to a position and a coordinate system within the AR playset; and the physical dimensions of the AR playset are defined in absolute units or in units based on the size of one or more AR markers.

AR playsets can be custom designed for specific AR applications, such as being modeled after a recognizable environment found in an AR application. For example, a plastic racetrack can be modeled after a particular racing game, or a miniature model of a real world baseball stadium can be used as an AR playset when playing a specific baseball game with AR features. Other examples of AR playset types include, but are not limited to: dollhouses; model racetracks or electric train sets; model villages, towns, parks, or cities; model sports stadiums, or arenas; and model castles, or other landmarks. Additionally, an AR playset can contain other AR playsets within it, allowing the inner AR playsets to be removed, used, and/or defined separately.

Existing objects that were not originally intended for AR use can also be used as AR playsets by adding markers to them. For example, one or more decals can be applied onto an already created model train set in order that the model train set can be used as an AR playset.

AR markers can be incorporated into an AR playset by painting, printing, applying a decal, ink stamping, placing an AR card onto the AR playset, weaving into a fabric, or by other means of adding a visual symbol onto the AR playset. AR markers can be formed by any means that creates a visual symbol that can be recognized by a camera. Objects intended for other uses may be arranged in such a way that an AR marker can be detected when viewing the objects from a certain perspective. For example, placing colored blocks together in a pattern and then viewing them from the top down may form a symbol that is recognized as an AR marker. Another example may be the view of a building, part of a building or other real world structure from a particular angle, where the view can be recognized as an AR marker.

AR playsets have known physical dimensions. The physical dimensions are defined in relation to the length and/or width of one or more AR markers in the AR playset. In some embodiments, the dimensions of the AR playset and AR markers may be defined by absolute metrics such as, for example, inches or centimeters, in a manner that dimensions of the AR playset and AR marker can be determined in relation to each other. In embodiments, the physical dimensions of the AR playset are used to generate a 3D virtual model (sometimes referred to herein as "virtual model object") of the AR playset, which is used in the AR application to address interactions between virtual and physical objects. The same virtual model may be used for addressing all of the above noted interaction types, or, in some embodiments, separate virtual models may be configured for each type of interaction.

Configuration information for the AR playsets, such as dimensions, coordinate system, placement of markers, and the like, can be provided by the user, for example, by configuration or based upon automatically generated object information. For example, physical objects that can be used as AR playsets are commonly designed using computer aided design software where a virtual model of each object is created that includes 3D data for use in manufacturing the physical objects. A designer may create a virtual 3D house and generate 3D data for it to be sent to a manufacturing facility to develop plastic molds, which are in turn used for fashioning real plastic houses from the design. In this example, the plastic houses may (after incorporating one or more AR markers) be used as AR playsets, and the 3D data may be used, as is, or after edits and/or changes by a user, by AR applications as model data for the plastic house AR playsets.

AR playset model data is configured to be accessible by the AR application. The model data can be provided when the AR application is not executing, or during initialization, through techniques such as the following: building the data into the AR application during software development, or downloading the data onto media that the AR application can access. The AR playset model data can also be provided at runtime, while the AR application is executing. This may be done via methods such as: scanning the data into the AR application from supplementary media, such as QR codes printed on paper, that are provided alongside the AR playset; scanning data into the AR application from contained media, such as QR codes printed on the AR playset itself; or sending data to the AR application electronically from an electronic AR playset.

To perform reference, collision, and occlusion, an origin and reference frame within the AR playset is defined relative to one or more AR markers. By specifying the mapping from an AR marker's reference frame to the AR playset's reference frame, a 3D virtual model representing the AR playset can be placed and oriented in the virtual world (also referred to as "virtual space") such that it coincides with the real world AR playset's shape and structure. This provides an AR application with accurate information on the size, position and orientation of each physical object in the virtual world, which information is then used for properly addressing object interactions.

Figure 2A:
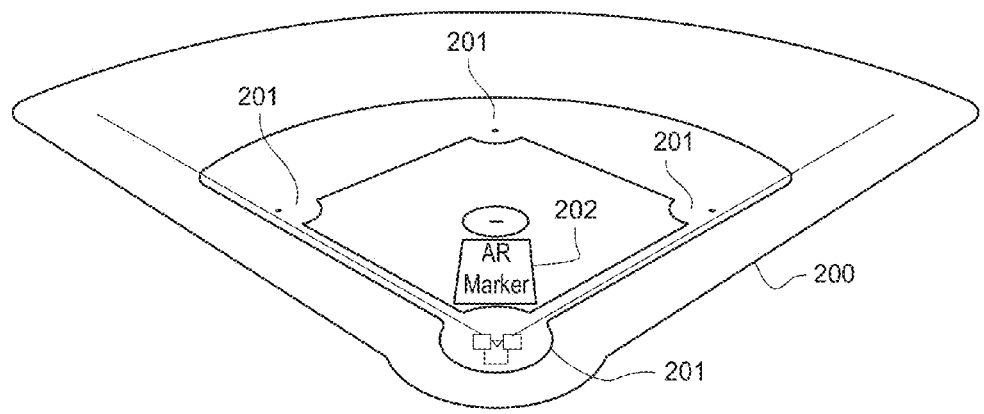
FIG. 2A illustrates an AR playset (AR playsets are described below) representing a baseball field, according to an embodiment.

FIG. 2A illustrates an AR playset representing a baseball field, according to an embodiment. The baseball field AR playset 200 may be a built-to-scale model of a real world baseball field. The AR playset may have many of the actual features of the real world baseball field modeled in it. In an AR application simulating a baseball game, each base is a location of interest, and an AR marker 202 alone does not describe the location of each base 201.

The reference constraint, as noted above, refers to how the various locations of interest of a physical object are addressed with one or only a few AR markers. Because an AR marker alone has no knowledge of the physical structure of the real world, it is unknown which points of interest are present and where they are located, unless each point of interest is identified by its own unique AR marker. When multiple AR markers are used, uniqueness may be required to prevent separate AR markers from being mistaken for each other while analyzing the image. Identifying each point of interest with its own AR marker may be undesired in AR applications for reasons such as: the system must perform image processing for each AR marker, thus resulting in excessive processing when numerous AR markers are used; many real world locations of interest should be represented by physical objects with complex shapes, and thus are poorly represented with flat AR markers; many real world locations of interest should look identical or very similar, and thus are unable to be differentiated by AR marker recognition algorithms, or requires excessive processing for accurate identification; and many real world locations of interest should not be represented by AR markers, for aesthetic reasons. As an example, although a unique AR marker can be used to represent each base 201 shown in FIG. 2A, such an approach may be undesirable. The first, second, and third bases should ideally appear visually identical and white, rather than each having a uniquely identifiable AR marker.

Some embodiments address the reference constraint by using controlled physical objects in conjunction with AR application software. Locations of interest within the one or more physical objects of an AR playset are pre-determined and specified in a coordinate system relative to an AR marker or to the AR playset. This allows the AR application to have knowledge of the real world and to provide virtual objects with corresponding locations of interest in the real world.

Figure 2B:
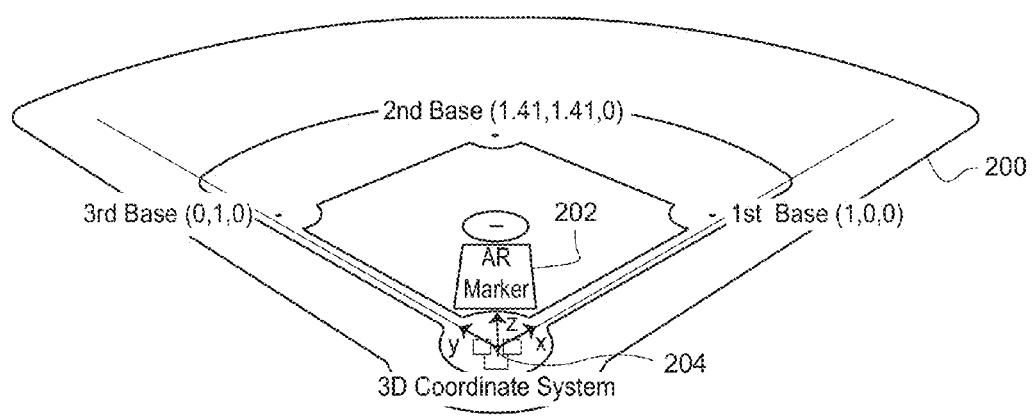
FIG. 2B illustrates the AR playset of FIG. 2A, with its 3-dimensional (3D) coordinate system, according to an embodiment.

FIG. 2B illustrates baseball field AR playset 200 of FIG. 2A, with a 3D coordinate system, according to an embodiment. As shown in FIG. 2A, instead of having a unique AR marker for each base 201, a 3D coordinate system is determined with its origin at location 204 in AR playset 200, and each base 201 is defined as a position in the 3D space which has its origin at location 204. By defining, in AR playset 200, the origin location 204 in relation to the position of AR marker 202, the positions of each of the bases (and any other locations of interest that have their locations defined) can be determined with accuracy. Moreover, with its origin located at the middle of the home plate, the 3D coordinate system within the baseball field AR playset 200 may consist of an x axis heading toward first base, a y axis heading towards third base, and a z axis heading upward into the air, as shown in FIG. 2B, such that player movements and the like can be displayed with accuracy. The 3D coordinate system of the AR playset enables realistic depiction of positional information related to various locations associated with the AR playset such as, for example, the realistic depiction of a player reaching or moving away from a base, or the realistic depiction in 3D space of a flag attached to a flagpole located on the baseball field.

In some embodiments, in addition to the AR marker shown in FIG. 2B, one or more other AR markers may be placed in various locations, such as on top of the dugout or on a billboard along an outfield wall. The AR markers' positions and orientations can be specified in the AR playset's coordinate system, which allows mapping from an AR marker reference frame into the AR playset's reference frame.

By defining locations of interest in an AR playset in relation to one or a small number of AR markers, embodiments overcome the reference constraint which, as noted above, is the situation where locations of interest within a physical object cannot be identified or referenced without each location being represented by an AR marker.

Figure 3:
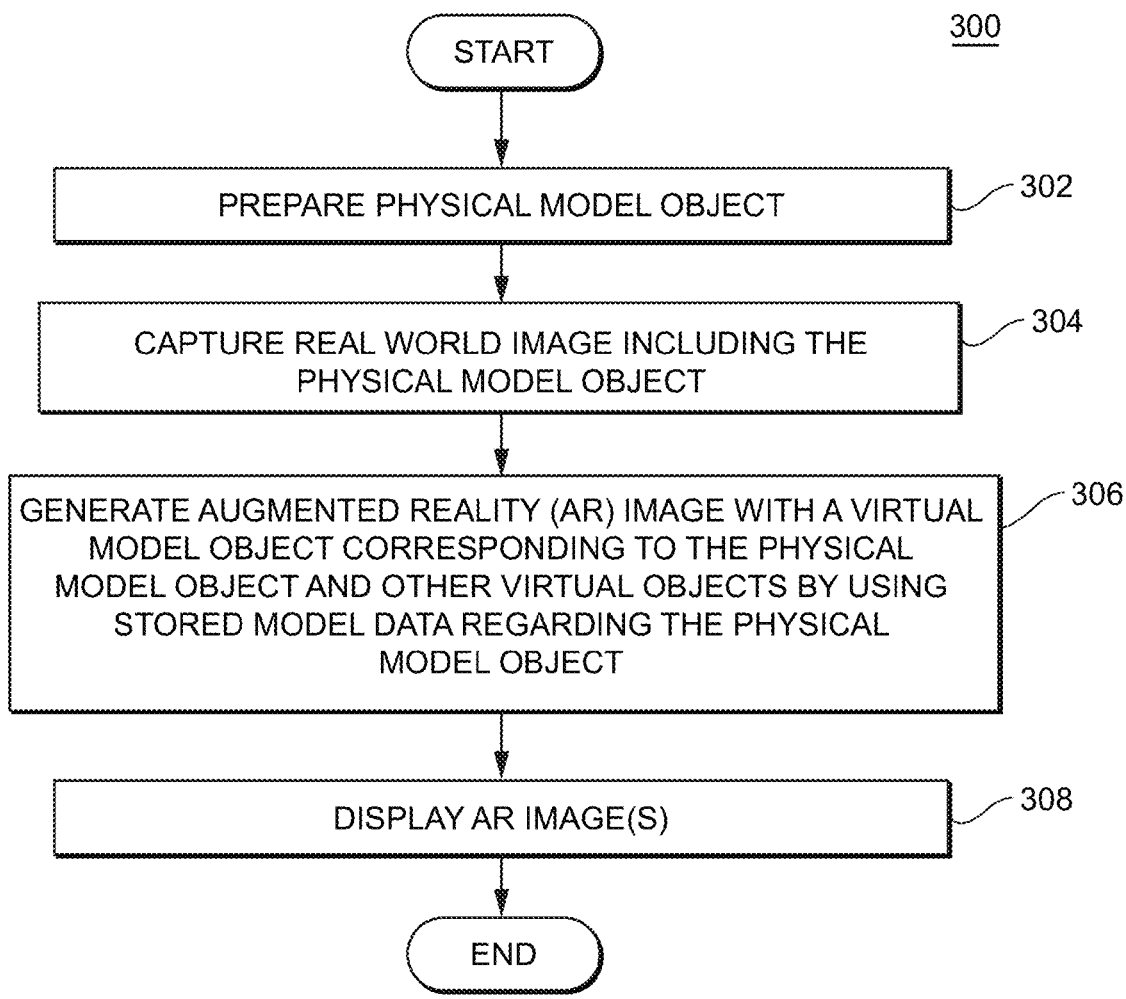
FIG. 3 illustrates a flowchart of a method for illustrating interactions between virtual and physical 3D objects using AR markers, according to an embodiment.

FIG. 3 illustrates a flowchart of a method 300 for illustrating interactions between virtual and physical 3D objects using AR markers, according to an embodiment. Method 300 can be performed by an AR application executing on an image processing device or system. Method 300 includes operations 302-308, which may be performed in an order different than shown, and which may be performed without one or more of the operations 302-308.

At operation 302, an AR playset for use in one or more AR images is formed. Forming the AR playset includes creating an AR playset and the information describing the created AR playset. As discussed above, an AR playset can be custom created or created by affixing one or more AR markers to already existing physical objects.

At operation 304, an image of a real space including the AR playset is captured. For example, an image is captured using a video camera or a still camera of a real space such that one or more AR playset, such as the AR playset formed at operation 302, is in the field of view of the imaging device. According to an embodiment, the capturing of real space images by a camera is controlled by an AR application executing in the image processing apparatus. For example, the camera may capture an image of a real space at regular intervals instructed by the AR application.

At operation 306, an AR image is generated where the AR image includes the AR playset and one or more other virtual objects for which their interactions with the AR playset are depicted based upon a virtual model object that corresponds to the AR playset. Generation of the AR image is described below in relation to method 400.

At operation 308, the AR image is displayed on a monitor or other display device, such that interactions such as collisions and occlusions between virtual objects and the AR playset are more convincingly illustrated from the user viewpoint than in conventional AR techniques. For example, virtual objects occluded by the AR playset are correctly displayed from the user's viewpoint of the AR playset (e.g., the user's viewpoint of the display device relative to the AR playset).

Figure 4:
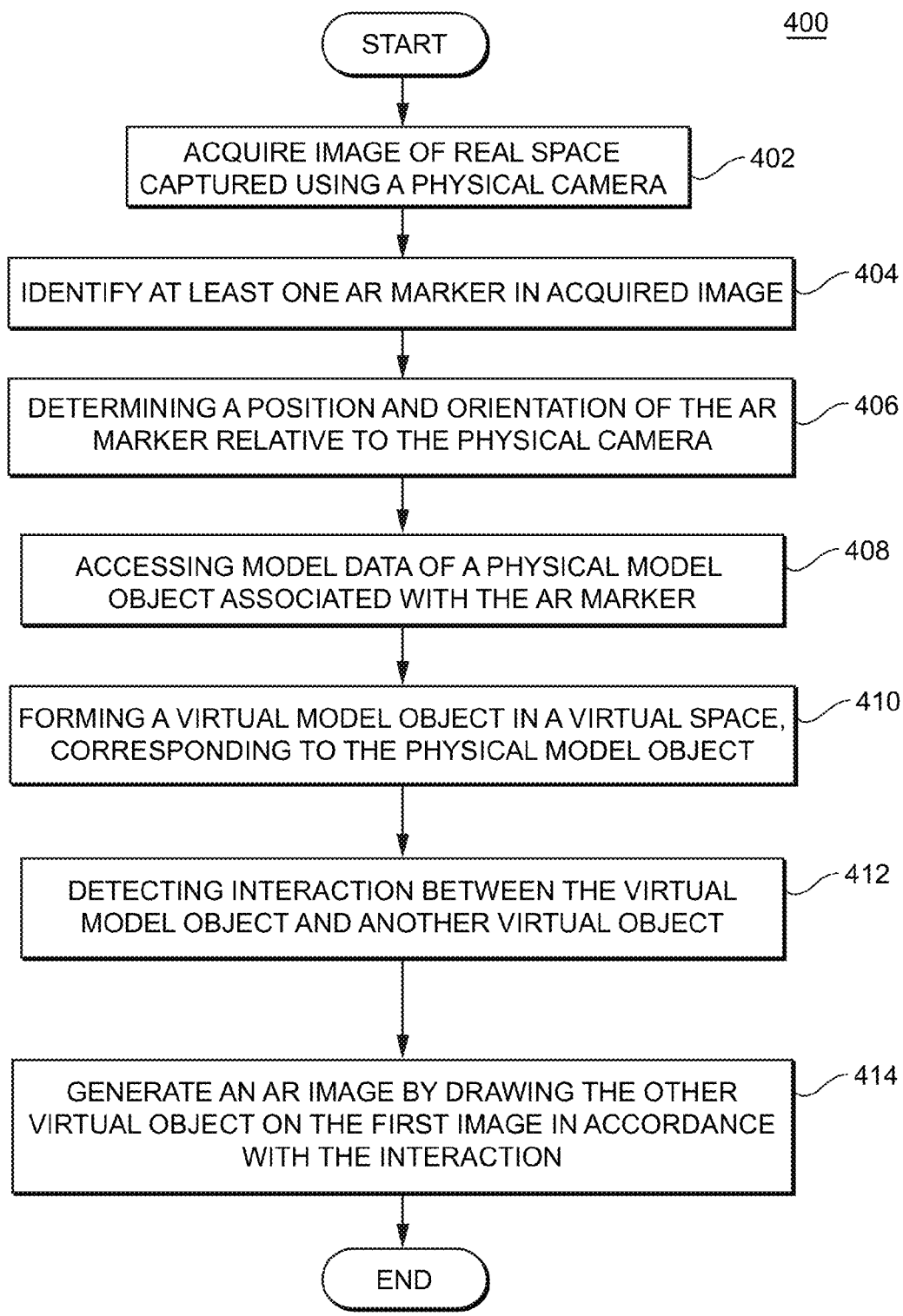
FIG. 4 illustrates a flowchart of a method for generating an AR image, according to an embodiment.

FIG. 4 illustrates a flowchart of a method 400 for generating an AR image, according to an embodiment. According to an embodiment, method 400 may be performed by an AR application when performing operation 306 described above. Method 400 includes operations 402-414, which may be performed in an order different than shown, and which may be performed without one or more of the operations 402-414.

At operation 402, an image of the real world (e.g. a real space) captured by an imaging device such as a physical camera is received. The image may be received to an area of a memory that can be accessed during the processing of method 400. The image may have been captured by a camera which is either co-located in the same image processing device that method 400 is being performed or in another device.

At operations 404, at least one AR marker is detected in the acquired real space image. The identification of AR markers in the image may be based upon image processing techniques, such as, for example, pattern matching. Known image processing techniques may be used to analyze the real space image for any patterns that match any of several marker patterns stored in a memory. The marker patterns may be stored as configuration data and may be updated as needed. According to an embodiment, a technique such as forming a binary image from the captured image, detecting areas of a predetermined shape in the binary image, and then determining a match between a detected area and a stored AR marker image based upon a homography between them is used. According to another embodiment, the matching may be between the stored marker patterns and the detected area transformed to be on a common reference plane with the stored marker patterns.

At operation 406, a position and orientation of the AR marker is determined relative to the physical camera which captured the real space image. The size, shape, and orientation of the AR marker in the real space image are analyzed to estimate a reference point and coordinate system. The viewing angle of the physical camera may cause the AR marker to be projected into the image with a distorted shape. The shape distortion may be used to estimate the viewing frame of reference. This frame of reference is defined relative to the physical camera that captured the image.

At operation 408, an AR playset associated with the detected AR marker is determined. The detected AR marker is used to access configured data in a memory in order to determine an AR playset that corresponds to the detected AR marker. Model data corresponding to one or more AR playsets and the mappings between the AR playsets and AR markers may be configured in a memory at some point before being accessed by the AR application.

At operation 410, a virtual model object in a virtual space is formed such that the virtual model object corresponds to the AR playset, and is placed in the virtual space to coincide with the AR playset in the real space. The position and orientation of the AR playset as determined based upon the position/orientation of the detected AR marker is used to determine how to place the virtual model object in the virtual space. The dimensions of the AR playset are specified in the corresponding model data. The size of the AR marker as detected in the real space image and the dimensions of the AR playset as defined in the model data are used to determine the size of the virtual model object in the virtual space. In effect, the model data stored in the memory is transformed in accordance with the relative differences between the AR marker as detected in the real space and the AR marker as stored in the memory. According to an embodiment, the real world frame of reference determined at operation 406 is used in mapping the virtual world's main coordinate system and virtual camera to the AR marker's real world position and the real world camera position, respectively.

At operation 412, interactions between the virtual model object and one or more other virtual objects are detected. The virtual model object may be configured, for example, upon creation based upon the AR playset, such that it can be used for detecting one or more types of interactions. According to one or more embodiments, model data for each AR playset includes a 3D shape of the AR playset.

Based upon the position/orientation information of the virtual model object and the position/orientation information of one or more other virtual objects, interactions, such as, for example, collisions and occlusions can be detected. For example, when a virtual arrow reaches a position at which the virtual model object of a wall exists, it can be determined that the virtual arrow collides with the virtual wall which, in this case, corresponds to a physical wall of an AR playset.

Figure 5A:
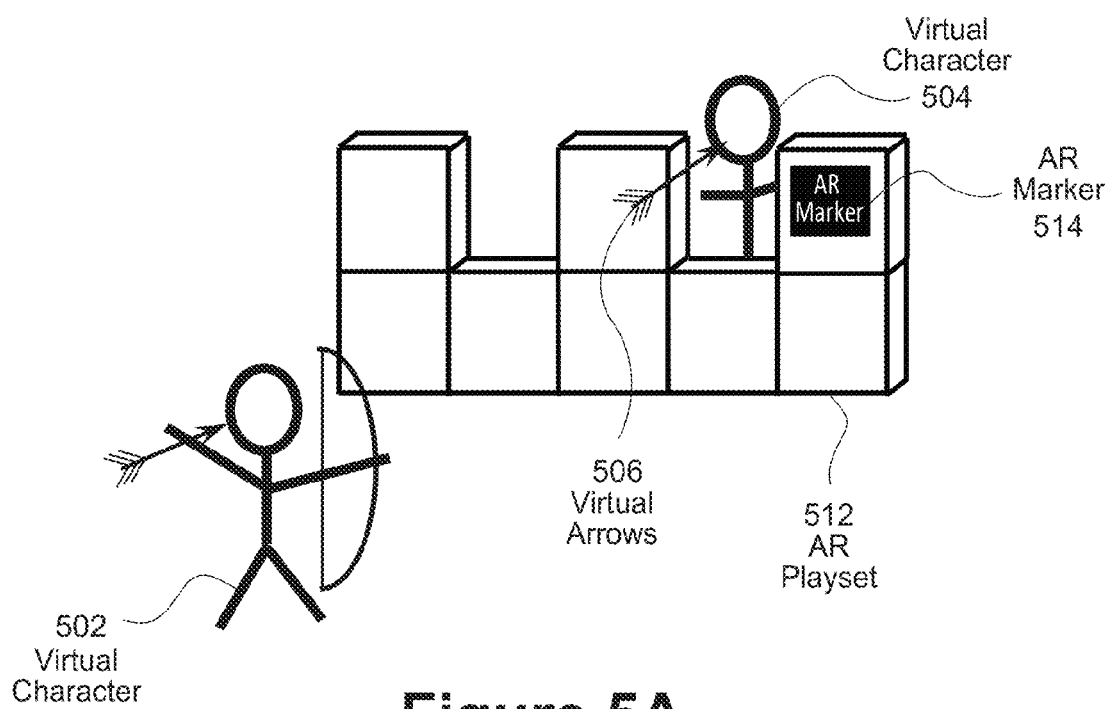
FIGS. 5A and 5B illustrate the display of interactions between virtual objects and an AR playset, according to an embodiment.
Figure 5B:
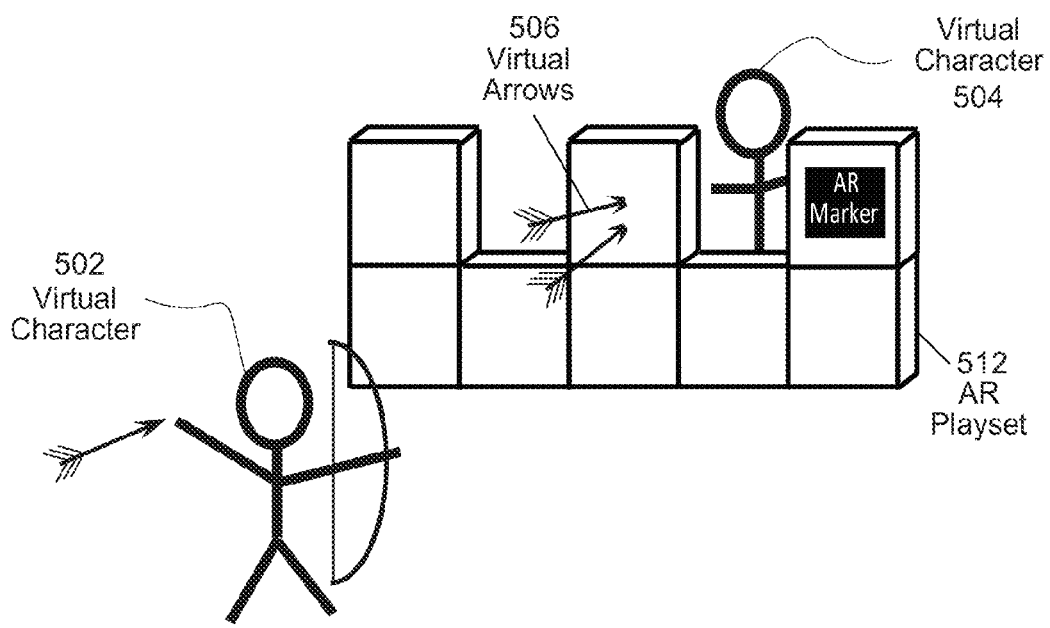

At operation 414, an AR image is generated by drawing the one or more other virtual objects on the first image in a manner that correctly reflects a result of the interaction detected at operation 412. The one or more other virtual objects are rendered to the real space image from the viewpoint of the virtual camera which is positioned in the virtual space so that it is coincident with the physical camera in the real space. For example, in order to correctly depict the collision event discussed above, the arrows 506 may be drawn such that they appear embedded in the wall of the AR playset 512, as shown in FIG. 5B. In order to correctly illustrate an occlusion interaction discussed above, virtual fish 606 may be rendered without drawing in the area 607 (see FIG. 6D) occluded by the rock 604 to result in an AR image such as that shown in FIG. 6E.

The collision constraint, as noted above, is a situation when a virtual object collides with a physical object, but the collision is not accounted for. Collision is conventionally handled in software by maintaining 3D models of each virtual object that can be collided with, and performing calculations to determine if collision is occurring between models. If collisions are found, these are usually handled by moving objects appropriately in the manner defined by the software.

In dynamic scenes, virtual objects may move or animate. When this happens in an AR application, they may be displaced into a position that penetrates physical objects. Since AR markers do not specify collision information for physical objects, virtual objects will not react properly by stopping or bouncing or falling off of the physical object. Instead, the virtual objects will act as though there is no collision, and simply penetrate physical objects, or move right through them. For example, in FIG. 5A, if a virtual character 502 shoots a virtual arrow 506 through a real world wall (represented by AR playset 512 which has AR marker 514 placed upon it) at another virtual character 504, no collision with the wall will be detected in conventional software, and no collision response with the wall will occur. The arrow 506 will fly right through the wall represented by AR playset 512. This constrains the AR application because it does not appear convincing, and entertainment value is hindered.

FIG. 5B illustrates the display of a collision between virtual arrow 506 and the wall as represented by AR playset 512, according to an embodiment. The collision of virtual arrow 506 with outer surface of the wall can be detected based upon AR playset 512, and a resulting effect of the collision, such as, for example, virtual arrow 506 partially embedding in the wall, may be illustrated as part of the image. In order to determine the collision, characteristics of the real world wall such as the position, orientation and size may be required. AR playset 512 corresponding to the wall is determined based upon AR marker 514 that is detected on the wall and provides these details to the AR application. Specifically, the size of the wall, the positioning of the wall in relation to the virtual characters and virtual arrows, etc. is determined based upon the model data of AR playset 512.

Figure 6B:
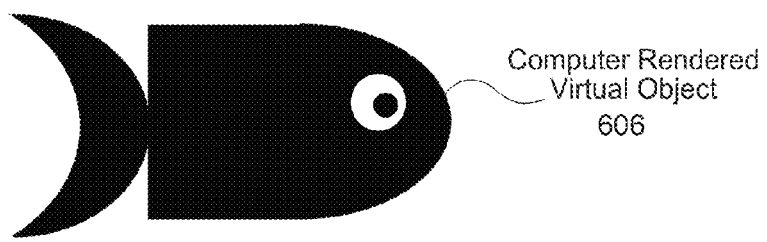
FIG. 6B shows a virtual object representing a fish, according to an embodiment.
Figure 6C:
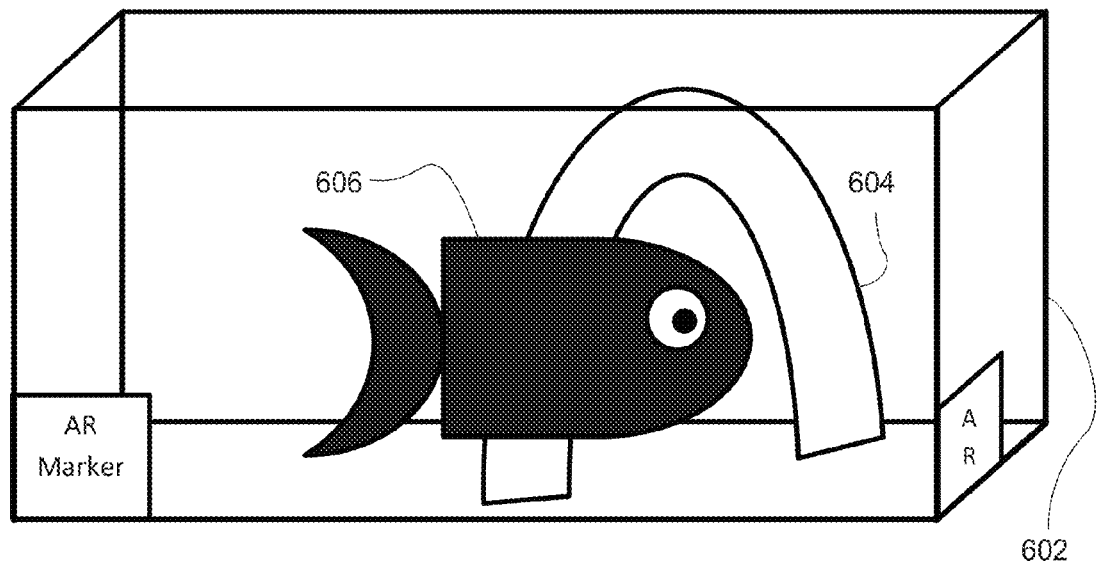
FIG. 6C shows an example incorrect composite image of the AR playset of FIG. 6A and virtual object of FIG. 6B.

The occlusion constraint, as noted above, is the situation that occurs when virtual objects are positioned such that they should be occluded by a physical object, but the occlusion is not accounted for in the image. For example, if virtual fish 606 shown in FIG. 6B is located such that it peeks out from behind real world rock 604 in real world fish tank 602 shown in FIG. 6A, the real rock 604 should be drawn over part of the virtual fish 606. Because AR markers 612 and 614 are the only physical objects of the fish tank 602 which are recognized and spatially defined in the scene, no occlusion information is available for conventional AR applications. Thus, conventionally, AR applications draw virtual objects over any physical objects, even if they are really located behind those physical objects. For example, in the above scenario, a conventional AR application would render virtual fish 606 in fish tank 602 as shown in FIG. 6C—with the virtual fish drawn incorrectly over the real world rock.

Figure 6D:
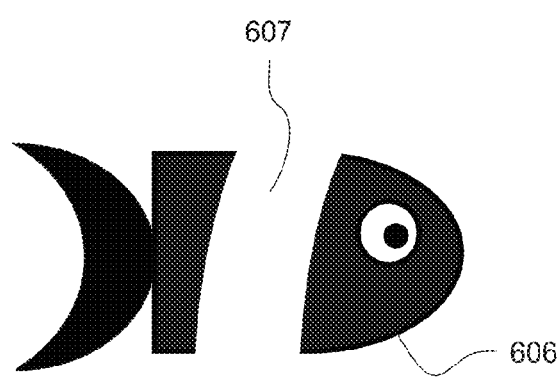
FIG. 6D shows the virtual object of FIG. 6B when placed in the AR playset of FIG. 6A correctly illustrating occlusion of a virtual object, in accordance with an embodiment.
Figure 6E:
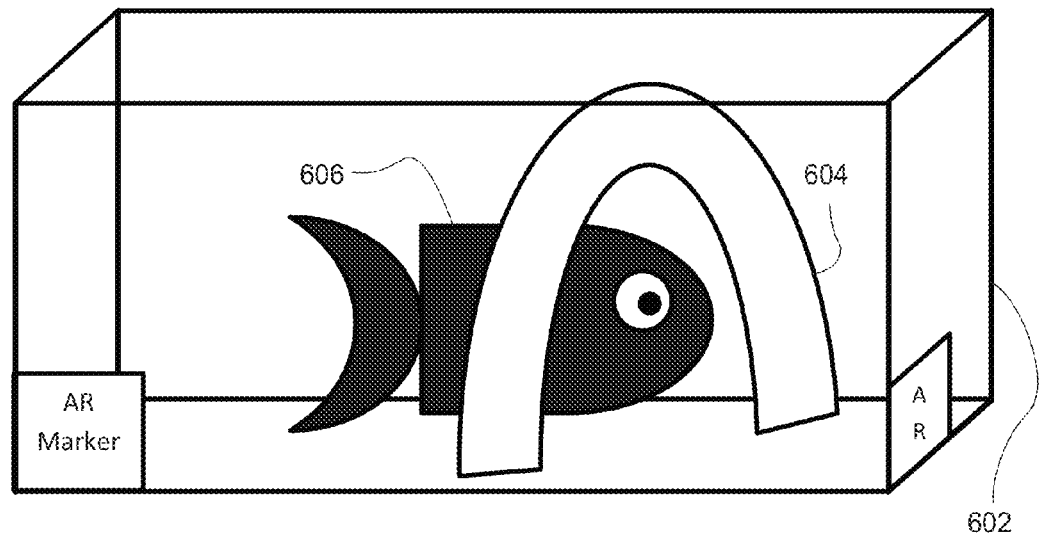
FIG. 6E illustrates a composite image of FIGS. 6A and 6B, in accordance with an embodiment.

FIG. 6D illustrates, in accordance with an embodiment, virtual fish 606 with a part 607 of it occluded by rock 604. FIG. 6E illustrates a display when the fish 606 with occlusion incorporated as shown in FIG. 6D is combined with the fish tank, in accordance with an embodiment. As can be seen, FIG. 6E more realistically illustrates the fish as peeking from behind the rock in the fish tank, when compared to FIG. 6C.

An AR playset may contain objects which can be moved or rotated separately from the rest of the AR playset. These moving parts can still allow support for reference, collision, and occlusion by having their own local AR markers with unique position and orientation information. AR playsets may contain any number of stationary or moving parts, as long as the moving parts can be dealt with appropriately for reference, collision, and occlusion, or as long as they can be adequately ignored.

Examples of moving parts inside an AR playset, for which reference, collision, and occlusion may occur include, but are not limited to: a set of objects in an AR playset that contains an AR marker (e.g., a railway turntable that includes an AR marker in its design that can be freely spun, and the local AR playset model data for the turntable may be rotated separately from the rest of the AR playset); and a door, shutter, or draw bridge, where an AR marker can be set on the outside of a door, shutter or drawbridge to designate it as closed when the AR marker is seen, and open when the AR marker is not seen. Alternatively, an AR marker can be set on the inside of a door, so that it is visible when the door is completely open. Or, an AR marker can be set to be seen inside in a room which the door leads into, thereby alerting the AR application that the inside of a room is visible.

Examples of moving parts inside an AR playset for which collision and occlusion can be ignored or simplified include: a fan, propeller, wheel, watermill, etc. For example, virtual objects that are occluded by the moving part of the fan can be rendered with partial transparency rather than tracking the exact position of all fan vanes. Collision can be addressed by using 3D data that covers the entire area swept by the fan vanes. Occlusion by the vanes can be addressed by drawing occluded virtual objects with partial transparency.

Figure 7:
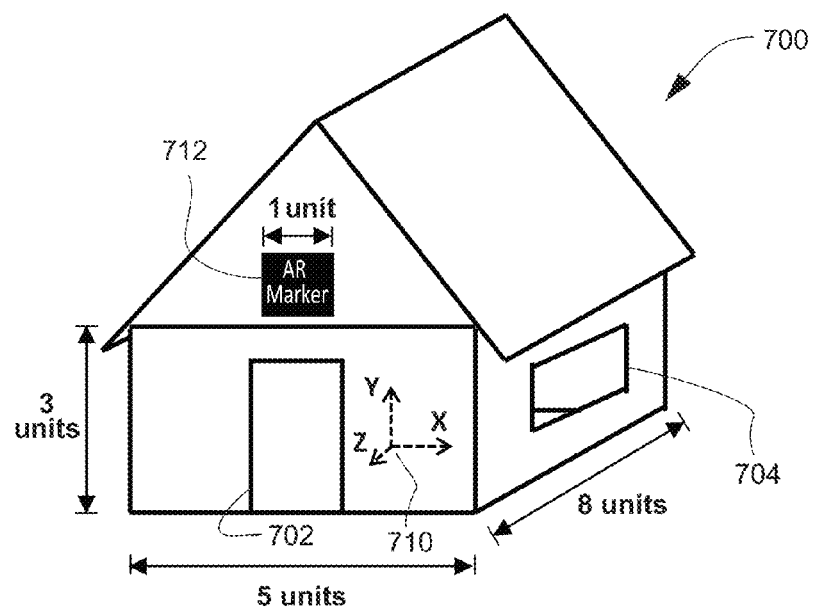
FIG. 7 illustrates an example AR playset representing a dollhouse and its coordinate system, in accordance with an embodiment.

A traditional dollhouse is an example of a physical object that can be configured as an AR playset with movable parts. FIG. 7 illustrates an example AR playset 700 representing a dollhouse and its coordinate system defined at the center 710 of the floor, in accordance with an embodiment. The physical dimensions of the dollhouse and its contained objects are configured in terms of the length of an AR marker as shown in FIG. 7 (e.g. AR marker length being regarded as a unit with which the other measurements are specified). For example, FIG. 7 shows AR marker 712, for which, the configuration data for the AR playset 700 would include the information that the AR marker, height, width, and length of the dollhouse would be, respectively, 1, 3, 5 and 8 units. The placement of various features or locations of interest, such as, for example, door 702 and window 704, may also be known in terms of AR marker 712. In addition, the location and orientation of at least one AR marker, such as, for example, AR marker 712, must be known relative to a defined dollhouse coordinate system, also shown in FIG. 7. Alternatively, measurements of the AR marker 712 and the dollhouse AR playset 700 may be specified in absolute terms (e.g. inches, feet) so that the size, position and/or orientation can be determined in relation to each other.

When multiple AR markers are used, different AR markers may be set in different locations of the AR playset in order to ensure that at least one AR marker is visible from any viewing angle intended to be used by the AR application. This allows a user to view the AR playset from multiple perspectives, such as from behind or from the front, and each AR marker's identity provides information on which area is being viewed.

An AR playset may have removable or adjustable pieces that allows for different configurations of the AR playset. The playset may contain viewable areas that are mutually exclusive, and may contain objects that can be removed or relocated by the user. AR markers can be used to inform AR applications regarding the particular configurations of an AR playset that has removable and/or adjustable components.

Figure 8A:
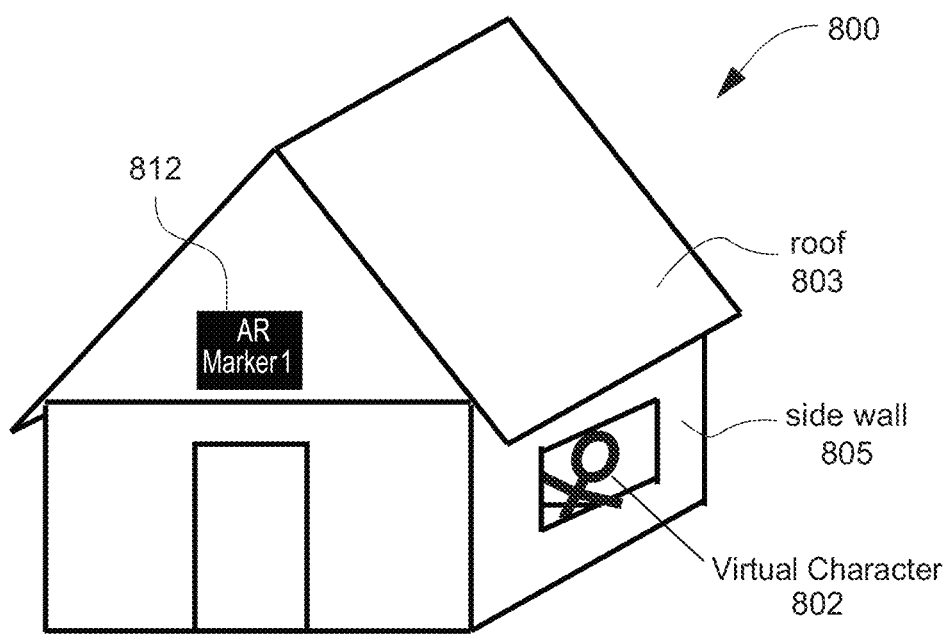
FIG. 8A illustrates the dollhouse AR playset of FIG. 7 with a virtual object displayed inside, in accordance with an embodiment.
Figure 8B:
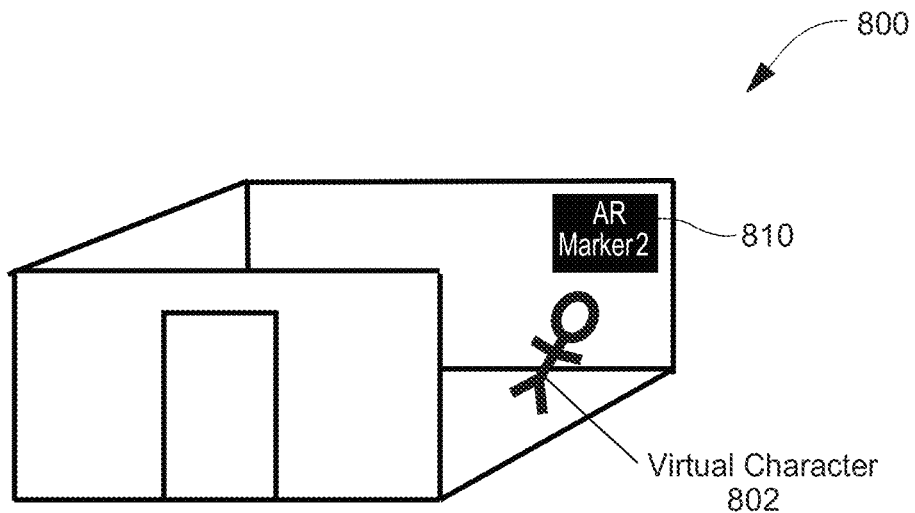
FIG. 8B illustrates the dollhouse AR playset of FIG. 7 with an interior wall identified by another AR marker, in accordance with an embodiment.

For example, an AR playset may be a dollhouse with a roof and wall that can be removed to see inside the house 800 as shown in FIG. 8A. While the roof 803 and wall 805 are attached, only an AR marker 812 on the roof on an external surface is visible, as shown in FIG. 8A. When the roof and wall are detached, as shown in FIG. 8B, a second AR marker 810 inside the house (attached to an internal wall or surface) is visible. The identification of AR marker 810 is used to determine if the roof and wall have been removed. When it is detected that the roof 803 and side wall 805 has been removed, various actions can occur. For example, a virtual character 802 that is only partially visible through a window in FIG. 8A when the roof 803 and wall 805 are attached, becomes completely visible when the roof and wall are detached, as shown in FIG. 8B.

In some embodiments, AR playsets may be placed together to combine into a larger environment for the AR application. For example, a train station AR playset may be combined with a fire station AR playset by placing them together in a pre-determined layout. The pre-determined layout can be configured such that one or more AR markers are placed in known locations relating to the individual component objects and the combined environment.

Figure 9A:
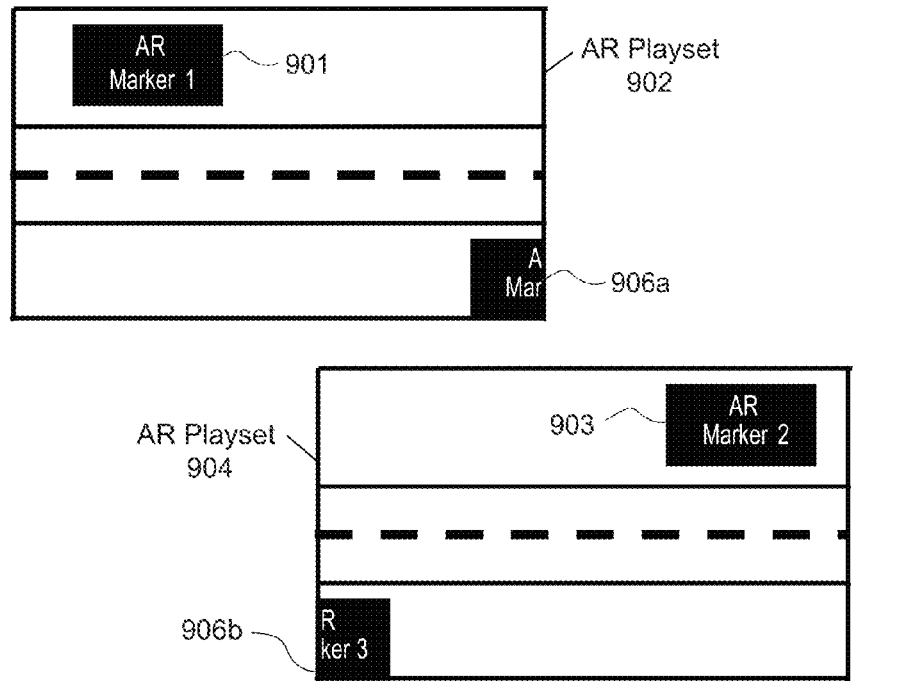
FIG. 9A illustrates two separate AR playsets representing respective portions of a race track, according to an embodiment.
Figure 9B:
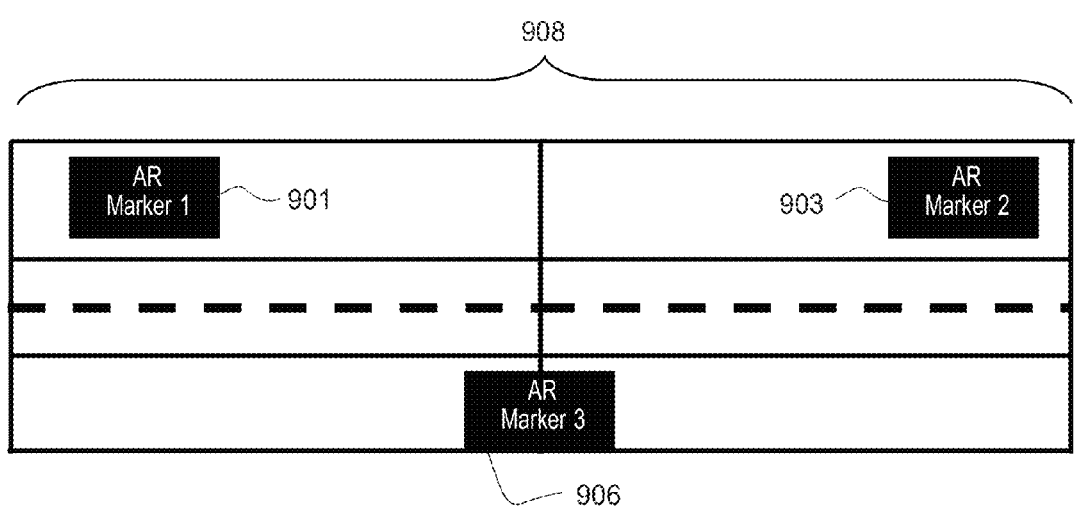
FIG. 9B illustrates combining the separate AR playsets of FIG. 9A to result in a combined playset, according to an embodiment.

One method of verifying a proper connection of components is to place half an AR marker on the edge of each AR playset that can be combined, as shown in FIG. 9A. For example, AR playset 902 includes an AR marker 901 and a partial AR marker 906a, and AR playset 904 includes an AR marker 903 and a partial AR marker 906b. The partial AR markers 906a and 906b may not be recognizable as AR markers by AR applications. Once a connection is correctly formed between AR playsets 902 and 904, the completed AR marker 906, which is a combination of 906a and 906b, will be visible, and the AR application may become aware of the connection, and resulting combined AR playset 908, as shown in FIG. 9B.

Figure 10:
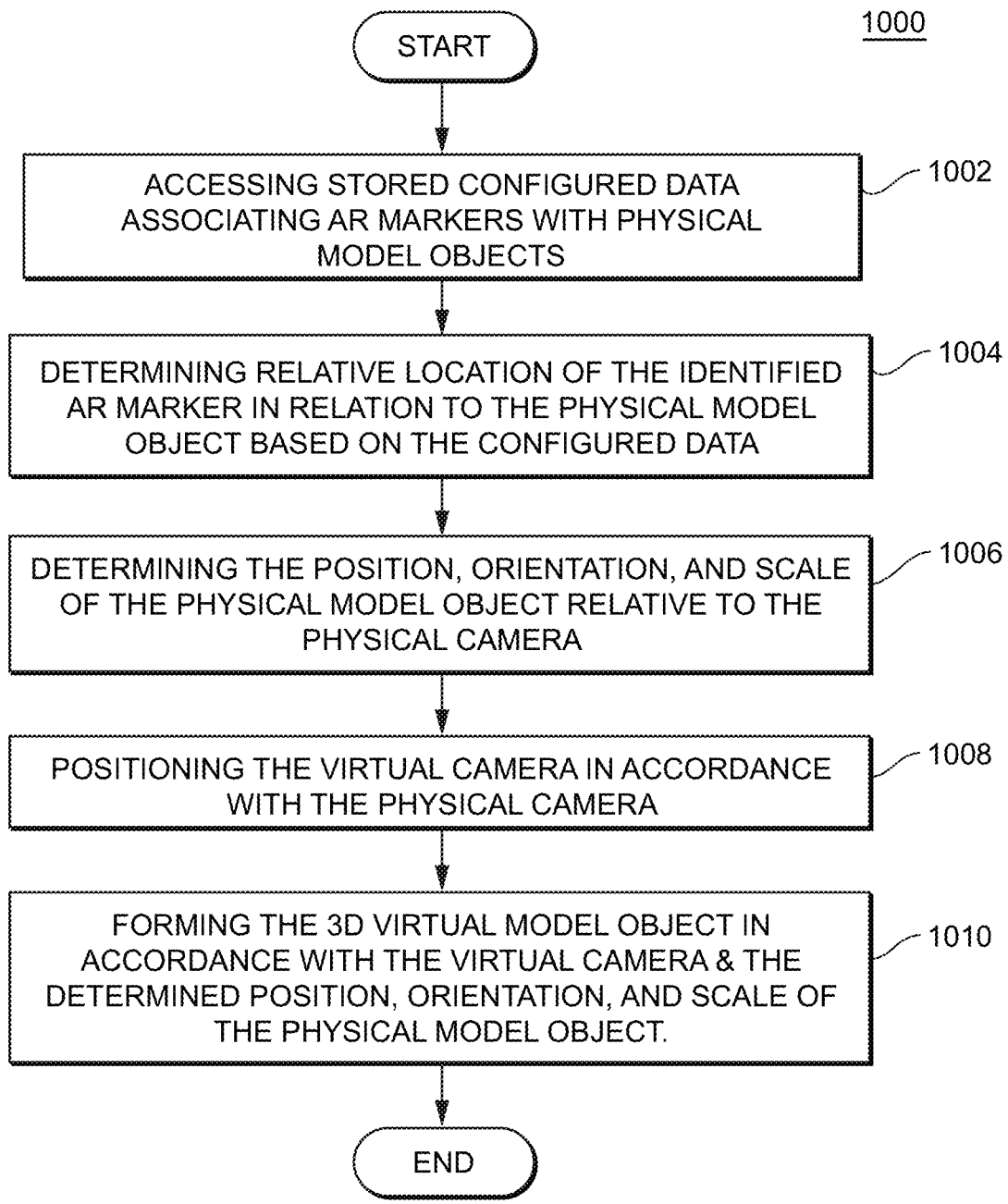
FIG. 10 illustrates a flowchart of a method for determining an AR playset associated with an AR marker, in accordance with an embodiment.

FIG. 10 illustrates a flowchart of a method 1000 for determining an AR playset associated with an AR marker and generating a corresponding 3D virtual model object, in accordance with an embodiment. According to an embodiment, method 1000 may be performed during operations 408-410 of method 400. Method 1000 includes operations 1002-1010, which may be performed in an order different than shown, and which may be performed without one or more of the operations 1002-1010.

At operation 1002, stored configured data that associate AR markers with AR playsets is accessed. As noted above, the data may have been configured and/or stored in a memory at any time during execution of the AR application, or during system or application initialization. According to an embodiment, the data may be loaded into memory from a file in a disk storage device, during application startup. The data includes mappings from each of one or more AR markers to one or more AR playsets. This data is accessed using the detected AR marker, and a corresponding AR playset is determined.

At operation 1004, a relative location of the detected AR marker in relation to the AR playset is determined based on the accessed data. When an AR playset that matches a particular detected AR marker is determined, the model data of that AR playset can be accessed to determine the location of the detected AR marker within the AR playset. In some embodiments, determining the location of the AR marker within the AR playset yields the position of the AR marker in relation to the AR playset, or the position of the AR marker within the coordinate system of the AR playset.

At operation 1006, the position, orientation and/or scale of the AR playset is determined relative to the physical camera. The detected size of the detected AR marker can be used in determining the size of the AR playset relative to the position/orientation of the physical camera. For example, the dimensions of the AR playset specified in the corresponding model data can be scaled according to the ratio of the size of the detected AR marker and the size of the AR marker as specified in the configuration data.

At operation 1008, the virtual camera is positioned in the virtual world in accordance with the relative position of the physical camera. In effect, the virtual camera is placed at a position and orientation in the virtual space that coincides with the physical camera's position and orientation in the real space, such that the viewpoint of the virtual camera into the virtual space is the same as the viewpoint of the physical camera when it captured the real space image.

At operations 1010, the 3D model virtual object is formed in accordance with the virtual camera and the determined position, orientation and scale of the AR playset. Having determined the size of the AR playset based upon the relative position of the physical camera, and having determined the relative position and orientation of the AR playset based upon the position/orientation of the detected AR marker, the 3D virtual model object is formed in the virtual space. As noted above, the position, orientation, and size of the 3D virtual model object in the virtual space can be determined by transforming the corresponding parameters in the model data in accordance with the detected position, detected orientation, and detected size of the AR marker(s) found in the real space image. For example, by comparing the size of the AR marker as detected in the real space image with the size of the AR marker in the configuration data accessed in the memory, the amount by which the respective AR playset dimensions should be scaled can be determined. The position and orientation of the virtual model object is also determined based upon the AR marker and the physical camera.

Figure 11:
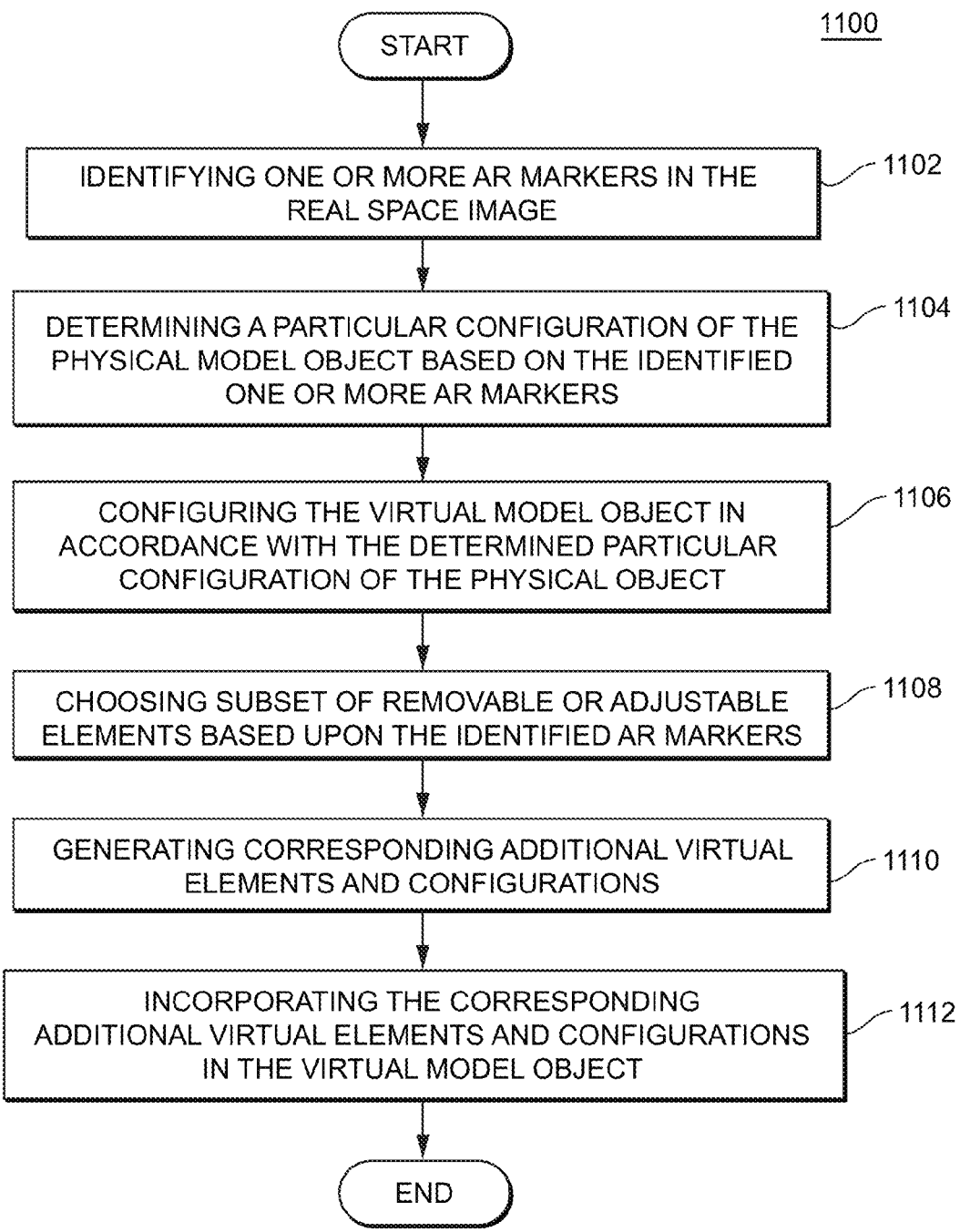
FIG. 11 illustrates a flowchart of a method for incorporating removable and/or adjustable components in an AR playset, in accordance with an embodiment.

FIG. 11 illustrates a flowchart of a method 1100 for incorporating removable and/or adjustable components in an AR playset, in accordance with an embodiment. Method 1100 includes operations 1102-1112, which may be performed in an order different than shown, and which may be performed without one or more of the operations 1102-1112.

At operation 1102, one or more AR markers in the real space image are identified. As noted above, some AR playsets may include multiple unique AR markers, with each of the AR markers representing a respective part of a composite AR playset. For example, a dollhouse, such as that shown in FIGS. 8A-B, with movable and/or adjustable furniture in real space may have respective markers for the dollhouse (or particular view of the dollhouse) and for each movable furniture item.

At operation 1104, a particular configuration of the AR playset is determined based on at least one of the identified one or more AR markers. Based upon one or more of the detected AR markers, a particular configuration of the AR playset may be determined. For example, with respect to FIGS. 8A-B, based upon whether AR marker 812 or AR marker 810 is detected, the particular configuration and/or view of the dollhouse 800 may be determined.

At operation 1108, based upon one or more of the detected AR markers, one or more removable or adjustable elements are determined as being visible in the real space image. For example, respective detected AR markers may correspond to removable items such as furniture items that are visible in the real space image.

At operation 1110, for each removable or adjustable element determined as being visible in the real space image, an additional virtual model element is generated based upon the corresponding AR playset for that element.

At operation 1112, the generated additional corresponding virtual model elements and configurations are incorporated into the virtual model object to generate a composite virtual model object. The composite virtual model object can then be used for detecting object interactions.

Figure 12:
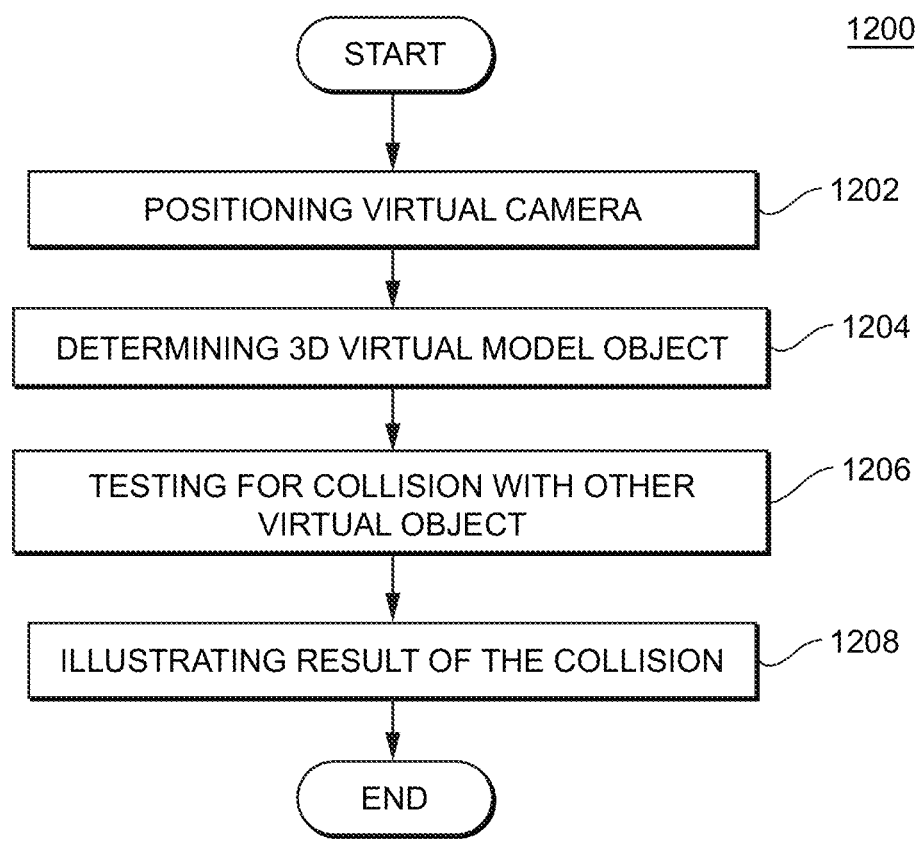
FIG. 12 illustrates a flowchart of a method for detecting collisions of virtual objects with physical objects, in accordance with an embodiment.

FIG. 12 illustrates a flowchart of a method 1200 for detecting collisions of virtual objects, in accordance with an embodiment. Method 1200 includes operations 1202-1208, which may be performed in an order different than shown, and which may be performed without one or more of the operations 1202-1208.

At operation 1202, the virtual camera is positioned such that the position and the orientation of the virtual camera in the virtual space coincide with the position and orientation of the physical camera in the real space.

At operation 1204, the 3D virtual model object is determined, for example, as described in relation to operation 1010 shown in FIG. 10.

At operation 1206, the 3D virtual model object is tested for collisions with one or more other virtual objects. The determination of a collision is determined in virtual space by determining whether the positions one or more other virtual objects or their respective movement paths would intersect a location in the virtual space occupied by the 3D virtual object model.

At operation 1208, the result of the collision is illustrated. If a collision is determined, a result of the collision is properly illustrated as shown for example in FIG. 5B. If no collision is detected, the one or more other virtual objects may be drawn on the captured image without regard to the AR playset.

Figure 13:
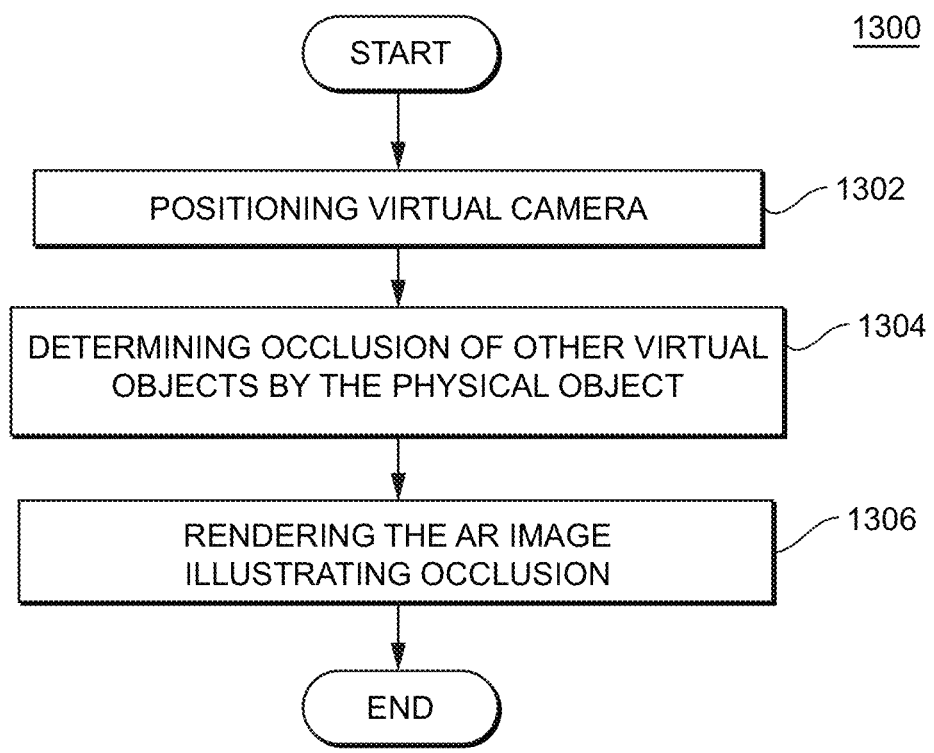
FIG. 13 illustrates a flowchart of a method for detecting occlusion of virtual objects by physical objects, in accordance with an embodiment.

FIG. 13 illustrates a flowchart of a method 1300 for detecting occlusion of virtual objects, in accordance with an embodiment. Method 1300 includes operations 1302-1306, which may be performed in an order different than shown, and which may be performed without one or more of the operations 1302-1306.

At operation 1302, the virtual camera is positioned such that the position and the orientation of the virtual camera in the virtual space coincides with the position and orientation of the physical camera in the real space, and a 3D virtual model object is determined, for example, as described in relation to operation 1010 shown in FIG. 10.

At operation 1304, occlusion of other virtual objects by the AR playset is determined. The determination is based upon the virtual model object and the one or more other objects in virtual space.

At operation 1306, the AR image illustrating the occlusion is rendered. When it is determined that occlusion occurs, the one or more objects that are occluded can be rendered so as to properly illustrate the occlusion. For example, as shown in FIG. 6D, the virtual fish 606, may be drawn without drawing in an area 607 which is determined to be occluded by the AR playset. A particular method of illustrating occlusion is described in relation to FIG. 14 below.

Figure 14:
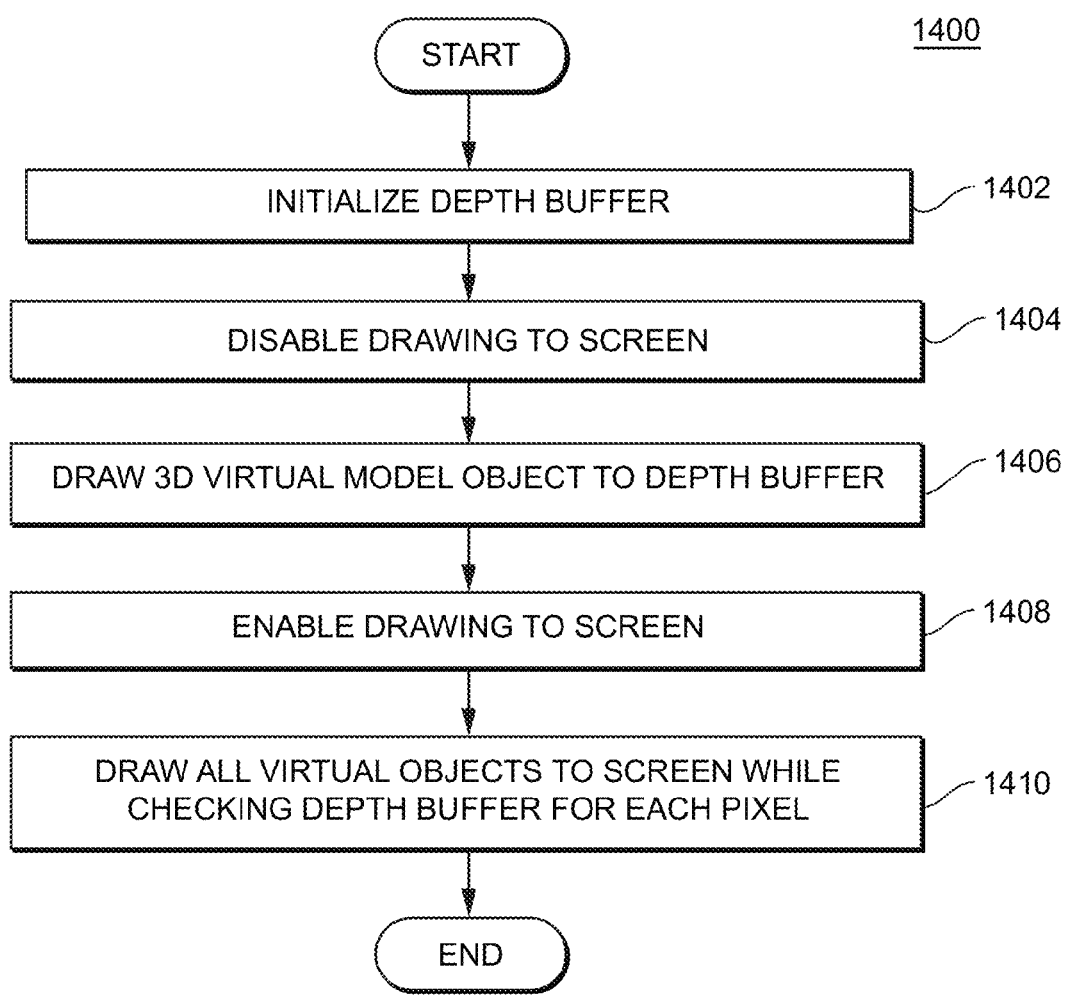
FIG. 14 illustrates a flowchart of a method for using a depth buffer to handle occlusion of virtual objects, in accordance with an embodiment.

FIG. 14 illustrates a flowchart of a method 1400 for using a depth buffer to handle occlusion of virtual objects, in accordance with an embodiment. Method 1400 includes operations 1402-1410, which may be performed in an order different than shown, and which may be performed without one or more of the operations 1402-1410.

At operation 1402, a depth buffer is initialized. The depth buffer may be an area in a memory of the information processing device. According to an embodiment, the depth buffer may be sized in accordance with the image.

At operation 1404, drawing to the screen is disabled.

At operation 1406, the 3D virtual model object is drawn to the depth buffer. According to an embodiment, for each pixel in the depth buffer covered by a 3D virtual model, the closest distance from the camera to the 3D virtual model object is stored.

At operation 1408, drawing is enabled to the screen.

At operation 1410, all virtual objects are drawn to the screen while checking the depth buffer for each pixel. For example, for each pixel of each virtual object, first, the corresponding pixel in the depth buffer is checked. If the depth buffer stores a distance value smaller than the distance from the camera to the virtual object currently being drawn, then that pixel of the virtual object is determined to be occluded, and that pixel is not drawn to screen.

Figure 15:
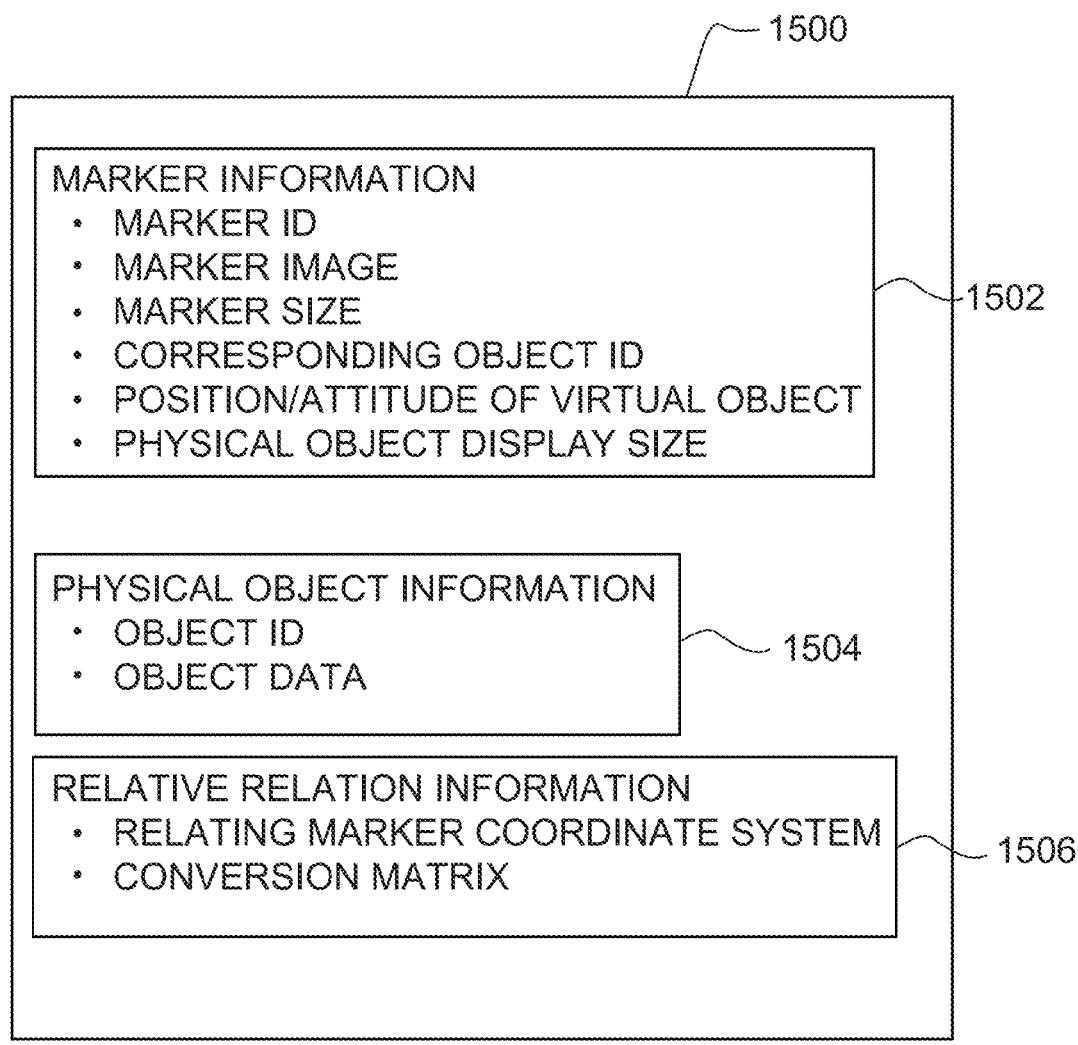
FIG. 15 is a block diagram view of a memory, in accordance with an embodiment.

FIG. 15 is a block diagram view of a memory in an image processing system or apparatus, in accordance with an embodiment. Memory 1500 comprises one or more memories storing one or more of data for marker information 1502, for object information 1504 and for relative relation information 1506.

Marker information 1502 includes configured information regarding AR markers. For each configured AR marker that is detectable by an AR application executed on the image processing system or apparatus, an identifier, an image or pattern, a size (absolute size or size relative to the physical object to which the AR marker is attached), one or more corresponding IDs of physical objects with which the marker is associated, position and attitude of the corresponding physical object, and a corresponding size of the physical object may be configured.

Object information 1504 comprises information for each of the physical objects which may correspond to detected AR markers. Object information 1504 includes data elements such as an object ID and object data for each physical object. The object data may include model data for each of the AR playsets that can be recognized by an AR application. The object ID uniquely identifies an AR playset or a particular configuration of an AR playset.

Relative relation information 1506 may include data elements relating to coordinate systems of the detected markers and/or selected AR playsets, and conversion matrices for converting from one frame of reference to another (e.g. from the marker coordinate system to AR playset coordinate system).

Figure 16:
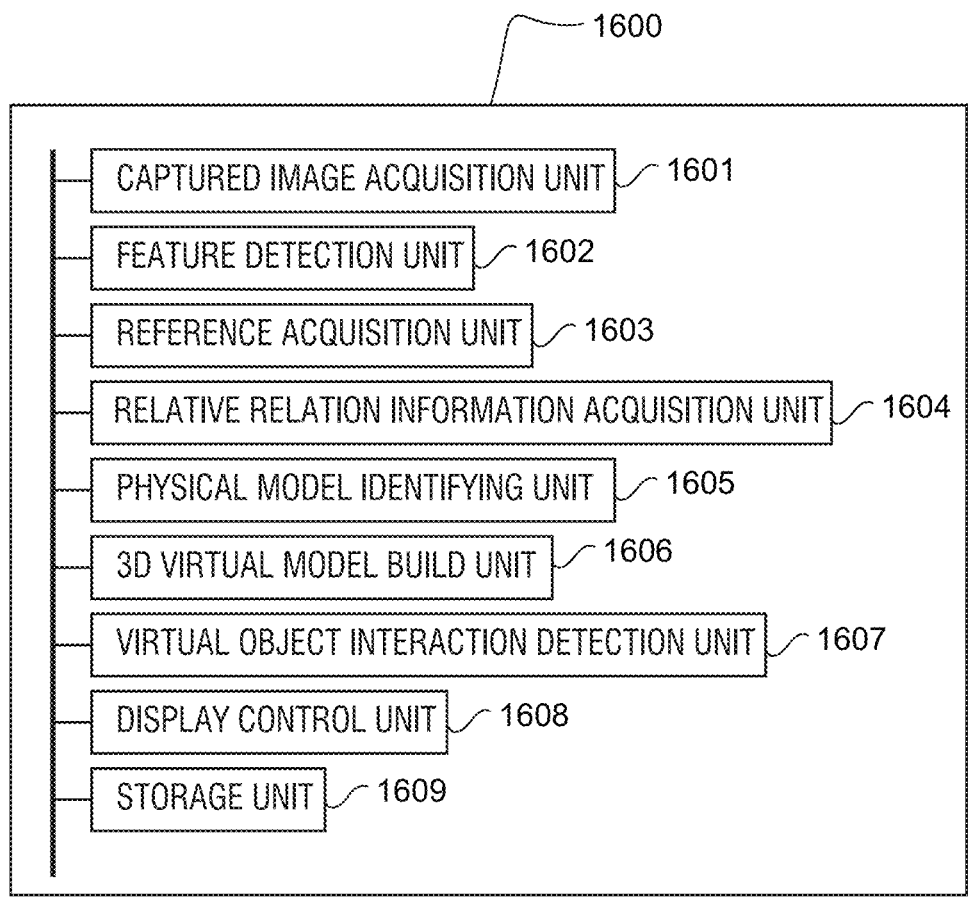
FIG. 16 is a block diagram of processing units, in accordance with an embodiment.

FIG. 16 is a block diagram 1600 of processing units of an image processing system or apparatus, in accordance with one or more embodiments. Processing units 1601-1609 are illustrated in FIG. 16 as being connected to a bus. However, a person of skill in the art will understand that some or all of these components may be, in whole or in part, implemented in software or in hardware, and may be interconnected in ways different from that shown in FIG. 16.

The captured image acquisition unit 1601 operates to receive an image of a real space from an imaging device such as a camera. In some embodiments, unit 1601 may obtain the captured image from storage, such as, a memory.

A feature detection unit 1602 operates to detect features, such as, for example, AR markers in the received real space image. The detection may be based upon, for example, analyzing the received image for the presence of a pattern or design matching any of the marker images stored in a memory such as memory 1500. For example, marker information 1502 in memory 1500 may include an image for each marker detectable by an image processing apparatus.

A reference acquisition unit 1603 operates to obtain and/or to determine the position and/or orientation of each detected marker in the real space represented in the received image. Determining the position of the AR marker may include comparing the detected marker to a corresponding stored marker image, and determining the orientation of the AR marker may include comparing the distortion of the detected marker against the corresponding stored marker image.

A relative relation information acquisition unit 1604 operates to calculate the relative positions of AR markers, AR playsets and other points of interest in relation to a physical or virtual camera. For example, relative relation information acquisition unit 1604 may comprise conversion matrices to, based upon the known position of an AR marker, determine a position in relation to the coordinate system of the AR playset in which the AR marker is placed or vice-versa. Conversion matrices for converting between respective AR markers of the same AR playset may also be calculated by unit 1604.

A physical model identifying unit 1605 operates to identify and/or access model data of an AR playset which corresponds to one or more AR markers detected by feature detection unit 1602. For example, marker information 1502 associates each marker with an AR playset.

A 3D virtual model build unit 1606 operates to form a 3D model of the physical model in virtual space in accordance with the size, position and/or orientation of the detected AR marker or markers. For example, based upon configured information such as marker information 1502, unit 1606 can determine the size, position and/or orientation of the AR playset and accordingly create a virtual model object.

A virtual object interaction detection unit 1607 operates to detect interactions, such as, for example, collisions and occlusions between virtual objects. Another type of an interaction is to locate a virtual object at a particular location relative to another object, such as, an AR playset. Unit 1607 detects interactions based upon locations of virtual objects in relation to a virtual model object in virtual space, where the virtual model objects corresponds to the AR playset in real space.

A display control unit 1608 operates to generate an AR image such that the interactions between the various objects are depicted correctly. For example, based upon interactions between virtual and physical objects detected by unit 1607, unit 1608 is configured to render the virtual objects over the captured real space image so that the interactions (e.g. occlusion, collision) are convincingly displayed.

A storage unit 1609 operates to store various configuration information and/or computation information. For example, storage unit 1609 may acquire and store in a memory, the model data for each of the AR markers that can be recognized by the information processing device, conversion matrices for converting between different coordinate systems, and AR market information.

Figure 17:
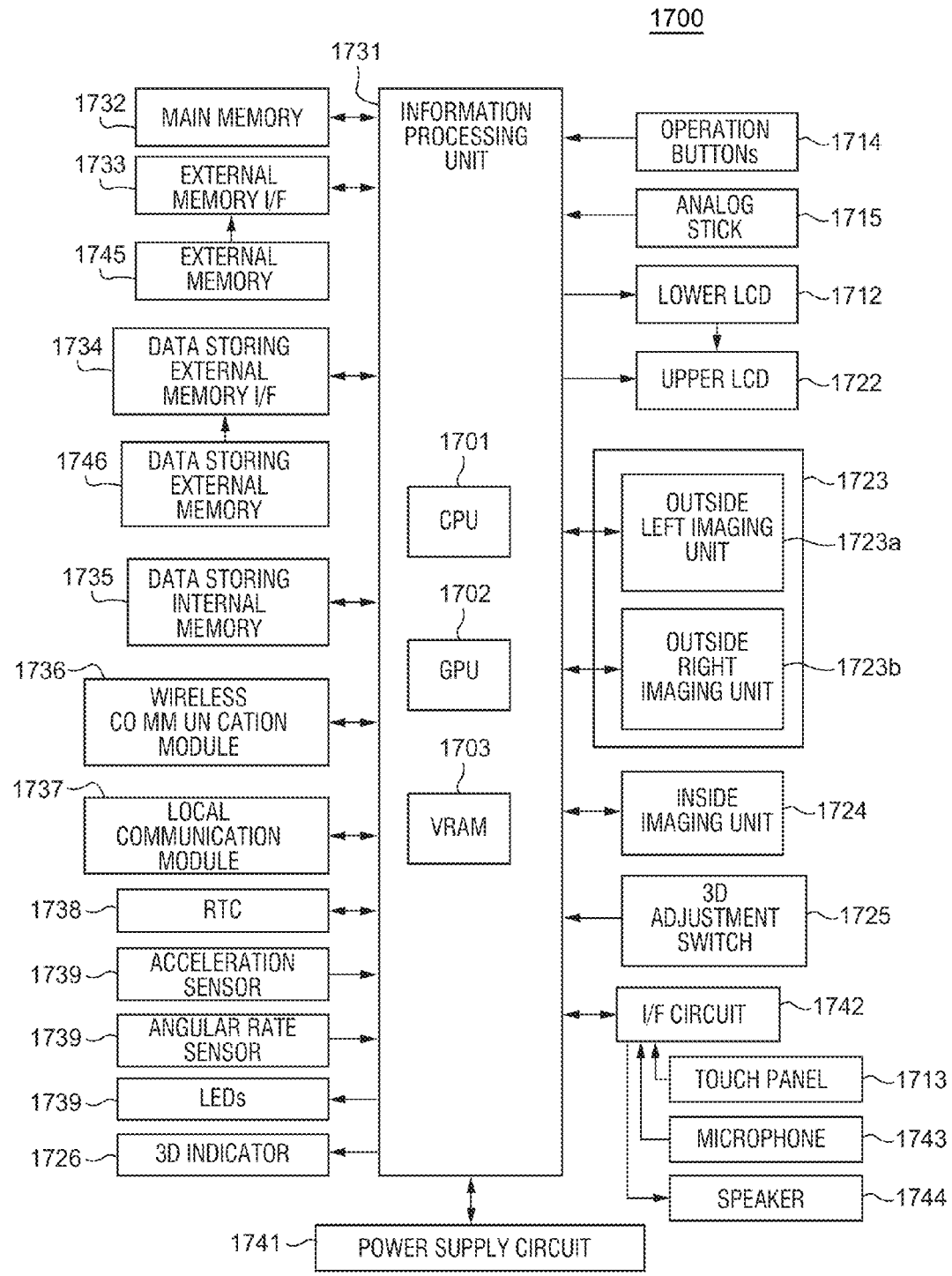
FIG. 17 is a block diagram of a device, in accordance with an embodiment.

FIG. 17 is a block diagram of an information processing device 1700, in accordance with an embodiment. According to an embodiment, FIG. 1700 corresponds to the image processing device described in relation to FIG. 1. The information processing device 1700 may include electronic components including an information processing unit 1731, a main memory 1732, an external memory interface (external memory I/F) 1733, a data storing external memory I/F 1734, a data storing internal memory 1735, a wireless communication module 1736, a local communication module 1737, a real-time clock (RTC) 1738, an acceleration sensor 1739, an angular rate sensor 1740, a power supply circuit 1741, and an interface circuit (I/F circuit) 1742. These electronic components are mounted on an electronic circuit board, and accommodated in the lower housing 1711 (or in the upper housing 1721).

The information processing unit 1731 includes a CPU (Central Processing Unit) 1701 for executing a program, such as, for example, an AR application discussed in relation to drawings including FIGS. 3 and 4, a GPU (Graphics Processing Unit) 1702 for performing image processing, and a VRAM (Video RAM) 1703. The CPU 1701 performs processing by executing the predetermined program stored in a memory within the information processing device 1700 (e.g. the external memory 1745 connected to the external memory I/F 1733 or the data storing internal memory 1735). The program executed by the CPU 1701 of the information processing unit 1731 may be acquired from other equipment by way of communication therewith. The GPU 1702 of the information processing unit 1731 generates an image in response to a command from the CPU 1701 of the information processing unit 1731 and renders the image in the VRAM 1703. The image rendered in the VRAM 1703 is output to and displayed on the upper LCD 1722 and/or the lower LCD 1712.

The information processing unit 1731 is connected to the main memory 1732, the external memory I/F 1733, the data storing external memory I/F 1734, and the data storing internal memory 1735. The external memory I/F 1733 is an interface for removably connecting the external memory 1745. The data storing external memory I/F 1734 is an interface for removably connecting the data storing external memory 1746.

The main memory 1732 is volatile storage means used as a work area or buffer area of the information processing unit 1731 (e.g. CPU 1701). Specifically, the main memory 1732 temporarily stores various data or a program acquired from an external source (the external memory 1745 or other equipment). In the present embodiment, a PSRAM (Pseudo-SRAM), for example, is used as the main memory 1732.

The external memory 1745 is non-volatile storage means for storing a program to be executed by the information processing unit 1731. The external memory 1745 is formed, for example, of a read-only semiconductor memory. When the external memory 1745 is connected to the external memory I/F 1733, the information processing unit 1731 is enabled to read a program stored in the external memory 1745. Predetermined processing is performed by the information processing unit 1731 executing the read program.

The data storing external memory 1746 is non-volatile random-access memory (e.g. NAND-type flash memory), and is used for storing predetermined data. For example, the data storing external memory 1746 may be an SD card. The data storing internal memory 1735 is formed of a random-access non-volatile memory (e.g. NAND-type flash memory), and is used for storing predetermined data. For example, data or a program downloaded by wireless communication through the wireless communication module 1736 are stored in the data storing external memory 1746 and the data storing internal memory 1735.

The information processing unit 1731 is connected to the wireless communication module 1736 and the local communication module 1737. The wireless communication module 1736 has a function of connecting to a wireless LAN by a method according to IEEE802.11b/g standard, for example. Using the wireless communication module 1736, the information processing unit 1731 is capable of exchanging data with other equipment via the Internet, and performing direct wireless communication with another information processing device 1700 in IEEE802.11b/g ad-hoc mode. The local communication module 1737 has a function of performing wireless communication with another game device of the same type by a predetermined communication method (e.g. infrared-ray communication). The information processing unit 1731 is capable of exchanging data with another game device of the same type with the use of the local communication module 1737.

The information processing unit 1731 is connected to the acceleration sensor 1739. The acceleration sensor 1739 detects a magnitude of acceleration in a linear direction (linear acceleration) along three axes (x, y and z axes). The acceleration sensor 1739 may be either an electrical capacitance type acceleration sensor or another type of acceleration sensor. The acceleration sensor 1739 may be an acceleration sensor for detecting acceleration in a direction along a single or two axes. The information processing unit 1731 receives data (acceleration data) indicating the acceleration detected by the acceleration sensor 1739 and calculates an attitude or motion of the information processing device 1700.

The information processing unit 1731 is connected to the angular rate sensor 1740. The angular rate sensor 1740 detects an angular rate around each of the three axes of the information processing device 1700, and outputs data indicating the detected angular rate (angular rate data) to the information processing unit 1731. Upon receiving the angular rate data output from the angular rate sensor 1740, the information processing unit 1731 calculates an attitude or motion of the information processing device 1700.

The information processing unit 1731 is connected to the RTC 1738 and the power supply circuit 1741. The RTC 1738 counts time and outputs the counted time to the information processing unit 1731. The information processing unit 1731 calculates current time of day based on the time counted by the RTC 1738. The power supply circuit 1741 controls power supplied from a power supply possessed by the information processing device 1700 (rechargeable battery accommodated in the lower housing 1711), and supplies the power to the components of the information processing device 1700.

The information processing unit 1731 is connected to the I/F circuit 1742. The I/F circuit 1742 is connected to a microphone 1743, a speaker 1744, and a touch panel 1713. The microphone 1743 detects the user's voice and outputs an audio signal to the I/F circuit 1742. The speaker 1744 amplifies the audio signal from the I/F circuit 1742 by means of an amplifier (not shown) and outputs sound. The I/F circuit 1742 includes a audio control circuit for controlling the microphone 1743 and the speaker 1744, and a touch panel control circuit for controlling the touch panel 1713. The audio control circuit performs A/D conversion and D/A conversion of the audio signal, or converts the audio signal into voice data of a predetermined type. In the present embodiment, a resistive film type touch panel is used as the touch panel 1713. However, the touch panel 1713 is not limited to the resistive film type. The touch panel 1713 may be any pressing-type touch panel, such as a capacitance-type touch panel. The touch panel control circuit generates a touch position coordinate on the touch panel 1713 of a predetermined type based on the signal from the touch panel 1713 and outputs the generated touch position coordinate to the information processing unit 1731. The information processing unit 1731 is enabled, by acquiring the touch position data, to detect the touch position where a touch input has been performed on the touch panel 1713.

The operating buttons 1714 and the analog stick 1715 are connected to the information processing unit 1731, and output operating data indicating inputs to the operating buttons 1714A to 1714E and analog stick 1715 to the information processing unit 1731. Upon acquiring the operating data from the operating buttons 1714 and the analog stick 1715, the information processing unit 1731 performs processing according to the inputs to the operating button 1714 and the analog stick 1715.

The lower LCD 1712 and the upper LCD 1722 are connected to the information processing unit 1731. The lower LCD 1712 and the upper LCD 1722 display an image according to instructions of the information processing unit 1731 (e.g. GPU 1702). The lower LCD 1712 is a display device for displaying an image in a planar manner (not in a stereoscopically viewable manner). The number of pixels possessed by the lower LCD 1712 is, for example, 320 dots×240 dots (W×H). Although a LCD is used as the display device in the present embodiment, other display devices such as a display device using EL (Electro Luminescence) may be used. A display device having a desired resolution can be used as the lower LCD 1712.

The upper LCD 1722 is a display device capable of displaying an image which is stereoscopically viewable with the naked eyes. The upper LCD 1722 used here is of a lenticular type or parallax barrier type so that a left-eye image and a right-eye image which are displayed alternately in a horizontal direction can be viewed separately and respectively by the user's left eye and right eye. The number of pixels possessed by the upper LCD 1722 is, for example, 800 dots×240 dots (W×H). In the present embodiment, the upper LCD 1722 is described as a liquid-crystal display device. However, the upper LCD 1722 is not limited to this, but may be a display device using, for example, EL or the like. Further, a display device having any resolution can be used as the upper LCD 1722.

Information processing device 1700 includes one or more imaging units, such as cameras. The outside imaging unit 1723 and the inside imaging unit 1724 are connected to the information processing unit 1731. Each of the outside imaging unit 1723 and the inside imaging unit 1724 captures an image, such as, for example, a real space image processed by the AR application discussed above, according to instructions of the information processing unit 1731, and outputs the captured image data to the information processing unit 1731.

The inside imaging unit 1724 includes a lens and an imaging element having a predetermined resolution. The imaging element may be, for example, a CCD image sensor or a CMOS image sensor. The lens may have a zooming mechanism.

Each of the outside left imaging unit 1723a and the outside right imaging unit 1723b includes a lens and an imaging element (e.g. a CCD image sensor or a CMOS image sensor). The imaging elements of the imaging units 1723a and 1723b have a predetermined common resolution. The lens may have a zooming mechanism. Depending on a program to be executed by the information processing device 1700, either one of the outside image units (outside left imaging unit 1723a and the outside right imaging unit 1723b) can be used alone. The following description of the present embodiment will be made in terms of a case in which only one of the outside imaging units is used.

The 3D adjustment switch 1725 is connected to the information processing unit 1731. The 3D adjustment switch 1725 transmits an electric signal according to a slider position to the information processing unit 1731.

Figure 18:
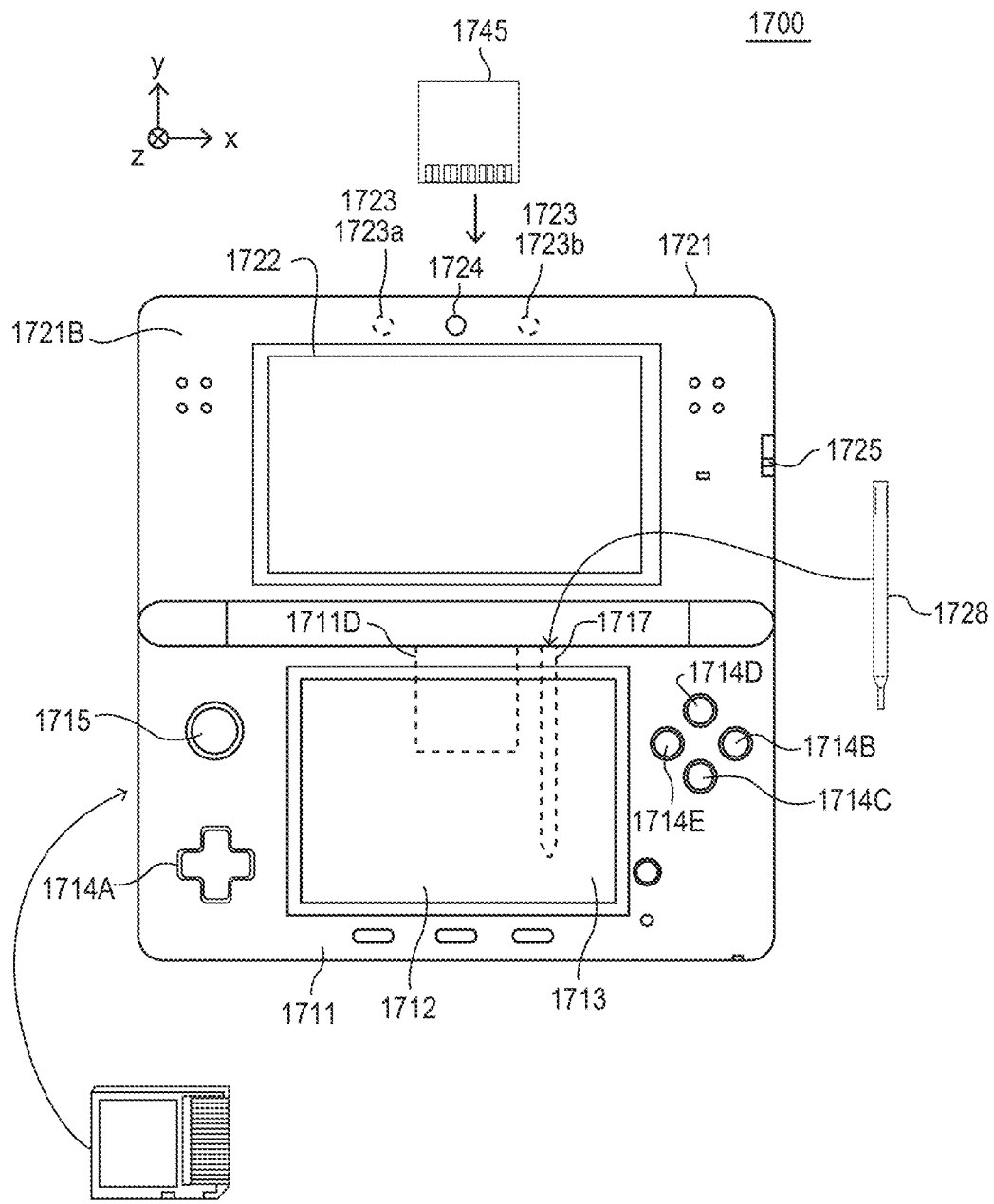
FIG. 18 is an external view of the device of FIG. 17, in accordance with an embodiment.

FIG. 18 is an external view of an information processing device 1700, in accordance with an embodiment. The information processing device 1700 has a lower housing 1711 and an upper housing 1721. The lower housing 1711 and the upper housing 1721 are openably/closably coupled to each other (in a foldable fashion) by means of a hinge structure.

The lower housing 1711 is provided with a lower LCD (Liquid Crystal Display) 1712, a touch panel 1713, operating buttons 1714A to 1714E, an analog stick 1715, an insertion hole 1711D, and another insertion hole 1717.

The lower LCD 1712 is a display device which displays an image planarly (not stereoscopically). The touch panel 1713 is one of input devices the information processing device 1700 has. A touch pen 1728 used to input on the touch panel 1713 is inserted into the insertion hole 1717 and accommodated therein (as indicated by the broken line in FIG. 18). The user may use his/her finger in place of the touch pen 1728.

The operating buttons 1714A to 1714E are input device for performing predetermined inputs. The buttons 1714A to 1714E are respectively assigned with functions according to a program to be executed by the information processing device 1700. The four-way button 1714A is used, for example, for SELECT operations or operations to move character objects in the game. The operating buttons 1714B to 1714E are used, for example, for decision operations or cancelling operations. The analog stick 1715 is a device for indicating a direction.

The insertion hole 1711D (indicated by the broken line in FIG. 18) is provided so that an external memory 1745 on which a game program is recorded is inserted therein.

The upper housing 1721 is provided with an upper LCD 1722, an outside left imaging unit 1723a, an outside right imaging unit 1723b, an inside imaging unit 1724, and a 3D adjustment switch 1725.

The upper LCD 1722 is a display device which is switchable between a stereoscopic display mode for displaying a stereoscopically viewable image and a planar display mode for planarly displaying an image (displaying a planarly viewable image). These display modes are switched over by means of the 3D adjustment switch 1725.

The inside imaging unit 1724 is an imaging unit which captures an image in an inward normal direction from an inner surface 1721B of the upper housing 1721. The outside left imaging unit 1723a and outside right imaging unit 1723b are both imaging units which capture an image in an outward normal direction from the outer surface opposite the inner surface 1721B. Hereafter, the outside left imaging unit 1723a and the outside right imaging unit 1723b are collectively referred to as the outside imaging unit 1723.

Although the descriptions herein are primarily based upon the virtual world and its objects being 3D, persons skilled in the art would appreciate that the disclosed techniques can be applied to other environments, such as, for example, 2D virtual worlds formed by using a single plane within a 3D space.

While the embodiments presented herein have been described in detail, the foregoing description is in all aspects illustrative and not restrictive. It is understood that numerous other modifications and variations can be devised without departing from the scope of the disclosed embodiments.

The invention claimed is:

1. A system for providing a virtual reality experience interacting with a real world physical structure having at least one marker, the system comprising:
a housing having a camera and a display disposed thereon,
the camera being capable of capturing an image of the real world physical structure and the at least one marker; and
at least one processor and associated memory in communication with the camera and the display, the memory storing data of at least a partial three dimensional model of the real world physical structure,
the processor being configured to:
provide a virtual object;
determine aspects of camera viewpoint of the housing relative to the real world physical structure at least in part in response to the at least one marker;
arranging the at least partial three dimensional model of the real world physical structure in a virtual space based upon the at least one marker; and
display an augmented reality view of the captured image of the real world physical structure on the display,
the processor using collision and/or occlusion detection between the at least partial three dimensional model of the real world physical structure arranged in the virtual space and the virtual object to control display of the virtual object interacting with the real world physical structure from the determined camera viewpoint.

2. The system of claim 1, the processor being further configured to:
form a virtual model object corresponding to the real world physical structure using the data of the at least partial three dimensional model in the memory, the forming including placing the virtual model object in a virtual space in accordance with a position and an orientation of the at least one marker in a real space in which the real world physical structure is located;
detect said interacting between the virtual model object and the virtual object in the virtual space; and
generate the augmented reality view of the captured image, the generated augmented reality view showing one or more of occluding or colliding between the virtual object and the real world physical structure.

3. The system of claim 2, the processor being further configured to:
calculate a size of the real world physical structure in accordance with a size of the identified at least one marker in the captured image; and
determine dimensions of the virtual model object based upon the calculated size of the real world physical structure.

4. The system of claim 2, the processor being further configured to:
compare dimensions of the marker as detected in the captured image with dimensions of the marker as previously recorded in the stored three dimensional model, wherein the stored three dimensional model includes relative dimensions of the marker and the real world physical structure; and
transform the at least partial three dimensional model in accordance with the comparing, wherein the virtual model object is based upon the transformed at least partial three dimensional model.

5. The system of claim 2, wherein the real world physical structure comprises a plurality of removable or adjustable elements, and the processor is further configured to:
identify one or more markers in the captured image, wherein each of the one or more markers is associated in the three dimensional model with a respective one of the removable or adjustable elements;
choose at least a subset of the plurality of removable or adjustable elements based upon the identified one or more markers;

generate corresponding virtual elements and configurations for respective ones of the removable or adjustable elements in the subset; and incorporate the generated corresponding virtual elements and configurations in the virtual model object.

6. The system of claim 2, wherein the real world physical structure comprises a first physical structure incorporating a first part of the at least one marker and one or more other physical structures each incorporating a respective other part of the at least one marker, and wherein when the first physical structure and the one or more other physical structures are properly arranged the first part and the respective other parts in combination form the at least one marker.

7. The system of claim 1, the processor being further configured to:

form a virtual model object corresponding to the real world physical structure using the data of the at least partial three dimensional model in the memory, the forming including placing the virtual model object in a virtual space in accordance with a position and an orientation of the at least one marker in a real space in which the real world physical structure is located;

detect said interacting between the virtual model object and the virtual object in the virtual space; and generate the augmented reality view of the captured image showing the virtual object disposed in relation to at least a part of the real world physical structure, wherein one or more locations in the virtual space where the virtual object is disposed in relation to the real world physical structure are determined using the formed virtual model object.

8. The system of claim 1, further comprising:

an augmented reality playset as the real world physical structure, including at least one marker, wherein the three dimensional model includes a position and an orientation of the at least one marker relative to a position and a coordinate system within the augmented reality playset, and wherein the three dimensional model further includes physical dimensions of the at least one augmented reality playset in absolute units or in units based on the at least one marker.

9. A computer-implemented method for providing a virtual reality experience interacting with a real world physical structure having at least one marker, the method comprising:

receiving a captured image of the real world physical structure, the captured image provided by a camera disposed in a housing;

identifying, by image processing performed on the captured image using at least one processor, the at least one marker disposed at a location of the real world physical structure;

determining aspects of camera viewpoint of the housing relative to the physical structure at least in part in response to the identified at least one marker;

arranging an at least partial three dimensional model of the real world physical structure in a virtual space based upon the at least one marker;

using collision and/or occlusion detection between the at least partial three dimensional model of the real world physical structure arranged in the virtual space and a virtual object to control display of interaction between the real world physical structure and the virtual object from the determined camera viewpoint; and displaying, on a display, an augmented reality view of the captured image including the controlled display of the interaction.

10. The method of claim 9, wherein the using an at least partial three dimensional model of the real world physical structure to determine a view of interaction comprises:

determining a position and an orientation of the identified at least one marker in a real space in which the real world physical structure is located;

accessing, in a memory associated with the processor arrangement, data of the at least partial three dimensional model;

forming a virtual model object corresponding to the real world physical structure using the accessed data, the forming including placing the virtual model object in a virtual space in accordance with the position and the orientation of the at least one marker in the real space;

detecting said interaction between the virtual model object and the virtual object in the virtual space; and generating the augmented reality view of the captured image, the generated augmented reality view showing one or more of occluding or colliding between the virtual object and the real world physical structure.

11. The method of claim 10, wherein the forming a virtual model object corresponding to the real world physical structure comprises:

determining a relative location of the identified at least one marker in relation to the physical structure based upon the accessed data; and using the determined relative location and the determined position and orientation of the identified at least one marker to calculate the position and orientation of the real world physical structure relative to the camera.

12. The method of claim 10, wherein the forming a virtual model object corresponding to the physical structure further comprises calculating a size of the real world physical structure in accordance with a size of the identified at least one marker in the captured image.

13. The method of claim 10, wherein the accessed data includes relative dimensions of the marker and the real world physical structure, and wherein the forming further includes comparing dimensions of the marker as detected in the captured image with dimensions of the marker as previously recorded in the accessed data; and transforming the at least partial three dimensional model in accordance with the comparing, wherein the virtual model object is based upon the transformed at least partial three dimensional model.

14. The method of claim 10, wherein the accessed data includes respective positions of elements of the real world physical structure, and wherein the forming a virtual model object corresponding to the real world physical structure further comprises calculating respective positions and orientations of the elements relative to the camera based upon the calculated position and orientation of the real world physical structure.

15. The method of claim 10, wherein the identifying at least one marker includes identifying a plurality of markers, wherein each of the plurality of markers is associated in the accessed data with a respective part of the real world physical structure.

16. The method of claim 15, wherein the forming a virtual model object corresponding to the real world physical structure comprises:

determining a particular configuration of the real world physical structure based upon the identified plurality of markers; and configuring the virtual model object in accordance with the determined particular configuration of the real world physical structure.

17. The method of claim 16, wherein the real world physical structure comprises a plurality of removable or adjustable elements, and wherein the configuring the virtual model object comprises:
choosing at least a subset of the plurality of removable or adjustable elements based upon the identified plurality of markers;
generating corresponding virtual elements and configurations for respective ones of the removable or adjustable elements in the subset; and
incorporating the generated corresponding virtual elements and configurations in the virtual model object.

18. The method of claim 10, wherein in addition to the identified at least one marker, one or more other markers are associated in the accessed data with the real world physical structure.

19. The method of claim 10, wherein the detecting said interaction comprises:
determining a shape associated with the virtual model object based upon the real world physical structure; and
testing for a collision between the virtual model object and the virtual object using the determined shape, and
wherein the generating the augmented reality view of the captured image comprises graphically illustrating a result of the collision in the augmented reality view.

20. The method of claim 10, wherein the detecting said interaction between the virtual model object and the virtual object comprises
determining, based upon the virtual model object, that a portion of the virtual object is occluded by the real world physical structure, and
wherein the generating the augmented reality view of the captured image further comprises rendering, as viewed from a virtual camera positioned in the virtual space based upon a position in the real space of the camera disposed in the housing, the augmented reality view having the portion of the virtual object occluded by the real world physical structure.

21. The method of claim 10, wherein the generating the augmented reality view comprises:
drawing the virtual model object to a depth buffer;
checking the virtual object against the depth buffer for occlusion by the virtual model object;
providing the virtual object with or without occlusion as determined according to the checking; and
rendering the provided virtual object on the captured image.

22. The method of claim 10, wherein the real world physical structure includes one or more external surfaces and one or more internal surfaces, and wherein the detecting said interaction comprises:
identifying, based upon the identified at least one marker, visible ones of the external surfaces and visible ones of the internal surfaces; and
determining the virtual model object in accordance with the identified visible external and internal surfaces.

23. The method of claim 22, wherein the detecting said interaction further comprises:
positioning a virtual camera in the virtual space based upon a position of the camera disposed in the housing; and
determining, based upon the virtual model object, that a portion of one of the visible internal surfaces is occluded by the virtual object, and
wherein the generating the augmented reality view comprises
rendering, as viewed from the positioned virtual camera, the augmented reality view having the portion of one of the visible internal surfaces occluded by the virtual object, and others of the visible internal surfaces and the visible external surfaces not occluded by the virtual object.

24. An apparatus for providing a virtual reality experience interacting with a real world physical structure having at least one marker, the apparatus comprising:
an image interface configured to receive, from a physical camera disposed at a location of a housing, a captured image of the real world physical structure;
a memory storing data of at least a partial three dimensional model of the real world physical structure; and
at least one processor in communication with the memory and the image interface, the processor configured to:
provide a virtual object;
determine aspects of camera viewpoint of the housing relative to the real world physical structure at least in part in response to said at least one marker;
arranging the at least partial three dimensional model of the real world physical structure in a virtual space based upon the at least one marker; and
display an augmented reality view of the captured image on a display,
the processor using collision and/or occlusion detection between the at least partial three dimensional model of the real world physical structure arranged in the virtual space and the virtual object to control display of the virtual object interacting with the real world physical structure from the determined camera viewpoint.

25. A non-transitory computer-readable storage medium having stored instructions which, when executed by at least one processor of a processing system, causes the processing system to perform operations for providing a virtual reality experience interacting with a real world physical structure having at least one marker, the operations comprising:
receiving a captured image of the real world physical structure, the captured image provided by a camera disposed in a housing;
identifying, by image processing performed on the captured image using the at least one processor, the at least one marker disposed at a location of the real world physical structure;
determining aspects of camera viewpoint of the housing relative to the physical structure at least in part in response to the identified at least one marker;
arranging an at least partial three dimensional model of the real world physical structure in a virtual space based upon the identified at least one marker;
using collision and/or occlusion detection between the at least partial three dimensional model of the real world physical structure arranged in the virtual space and a virtual object to control display of the interaction between the real world physical structure and the virtual object from the determined camera viewpoint; and
displaying an augmented reality view of the captured image including the controlled display of the interaction.

26. The non-transitory computer-readable storage medium according to claim 25, wherein the operations further comprise:
forming a virtual model object corresponding to the real world physical structure using data of the at least partial three dimensional model stored in a memory of the processing system, the forming including placing the virtual model object in a virtual space in accordance with a position and the orientation of the at least one marker in a real space in which the real world physical structure is located;

detecting said interaction between the virtual model object and the virtual object in the virtual space; and generating the augmented reality view of the captured image, the generated augmented reality view showing one or more of occluding or colliding between the virtual object and the real world physical structure.

27. The non-transitory computer-readable storage medium according to claim 26, wherein the operations further comprise:

comparing dimensions of the marker as detected in the captured image with dimensions of the marker as previously recorded in the three dimensional model, wherein the three dimensional model includes relative dimensions of the marker and the real world physical structure; and transforming the at least partial three dimensional model in accordance with the comparing, wherein the virtual model object is based upon the transformed at least partial three dimensional model.

28. The non-transitory computer-readable storage medium according to claim 26, wherein the operations further comprise:

identifying a plurality of markers in the captured image, wherein each of the plurality of markers is associated in the three dimensional model with a respective one of removable or adjustable elements of the real world physical structure;

choosing at least a subset of the plurality of removable or adjustable elements based upon the identified plurality of markers;

generating corresponding virtual elements and configurations for respective ones of the removable or adjustable elements in the subset; and incorporating the generated corresponding virtual elements and configurations in the virtual model object.

* * * * *